(12) United States Patent
DiChiara et al.

(10) Patent No.: US 8,744,956 B1
(45) Date of Patent: Jun. 3, 2014

(54) SYSTEMS AND METHODS FOR PERMISSION ARBITRATED TRANSACTION SERVICES

(75) Inventors: Christer J. DiChiara, San Diego, CA (US); Randall P. Mitchum, Tustin, CA (US); Mindy Ferguson, Irvine, CA (US); Kristin M. LeFevre, Orange, CA (US); James Andrew Jackson, Bartlett, IL (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

(21) Appl. No.: 13/594,448

(22) Filed: Aug. 24, 2012

Related U.S. Application Data

(63) Continuation-in-part of application No. 13/175,401, filed on Jul. 1, 2011.

(60) Provisional application No. 61/360,904, filed on Jul. 1, 2010, provisional application No. 61/527,573, filed on Aug. 25, 2011, provisional application No. 61/541,936, filed on Sep. 30, 2011.

(51) Int. Cl.
*G06Q 40/00* (2012.01)

(52) U.S. Cl.
USPC .............. 705/38; 705/35; 705/37; 705/39

(58) Field of Classification Search
CPC ........................................... G06Q 40/00
USPC ........................... 705/38, 35, 37, 39
See application file for complete search history.

(56) References Cited

U.S. PATENT DOCUMENTS

| | | | |
|---|---|---|---|
| 4,795,890 A | 1/1989 | Goldman | |
| 4,977,595 A | 12/1990 | Ohta et al. | |
| 5,351,293 A | 9/1994 | Michener et al. | |
| 5,590,038 A | 12/1996 | Pitroda | |
| 5,640,577 A | 6/1997 | Scharmer | |
| 5,715,314 A | 2/1998 | Payne et al. | |
| 5,754,939 A | 5/1998 | Herz et al. | |
| 5,828,837 A | 10/1998 | Eikland | |
| 5,844,218 A | 12/1998 | Kawan et al. | |

(Continued)

FOREIGN PATENT DOCUMENTS

| | | |
|---|---|---|
| EP | 1 028 401 | 8/2000 |
| WO | WO 99/60481 | 11/1999 |
| WO | WO 00/30045 | 5/2000 |
| WO | WO 01/84281 | 11/2001 |

OTHER PUBLICATIONS

CreditSesame; "FAQ's"; http://www.creditsesame.com/how-we-help/faqs/#cb printed Dec. 5, 2011 in 8 pages.

(Continued)

*Primary Examiner* — Jagdish Patel
(74) *Attorney, Agent, or Firm* — Knobbe, Martens, Olson & Bear, LLP

(57) ABSTRACT

Systems and methods disclosed enable a permitting party to share credit data and/or personal information with a receiving party, such as an individual with whom the permitting party has established a trusted connection. In some embodiments, the permitting party may define how much of the permitting party's personal information or other data is shared. In some embodiments, data sharing may be enabled, in part, by generating an identifier that may be provided to the receiving party in order to access the shared data.

18 Claims, 13 Drawing Sheets

(56) References Cited

U.S. PATENT DOCUMENTS

| | | |
|---|---|---|
| 5,903,830 A | 5/1999 | Joao et al. |
| 5,956,693 A | 9/1999 | Geerlings |
| 5,961,593 A | 10/1999 | Gabber et al. |
| 5,999,596 A | 12/1999 | Walker et al. |
| 6,021,943 A | 2/2000 | Chastain |
| 6,038,551 A | 3/2000 | Barlow et al. |
| 6,072,894 A | 6/2000 | Payne |
| 6,073,106 A | 6/2000 | Rozen et al. |
| 6,253,202 B1 | 6/2001 | Gilmour |
| 6,254,000 B1 | 7/2001 | Degen et al. |
| 6,263,447 B1 | 7/2001 | French et al. |
| 6,269,369 B1 * | 7/2001 | Robertson ............................. 1/1 |
| 6,282,658 B2 | 8/2001 | French et al. |
| 6,321,339 B1 | 11/2001 | French et al. |
| 6,327,578 B1 | 12/2001 | Linehan |
| 6,463,533 B1 | 10/2002 | Calamera et al. |
| 6,473,740 B2 | 10/2002 | Cockril et al. |
| 6,496,936 B1 | 12/2002 | French et al. |
| 6,581,059 B1 | 6/2003 | Barrett et al. |
| 6,601,173 B1 | 7/2003 | Mohler |
| 6,714,944 B1 | 3/2004 | Shapiro et al. |
| 6,734,886 B1 | 5/2004 | Hagan et al. |
| 6,750,985 B2 | 6/2004 | Rhoads |
| 6,754,665 B1 | 6/2004 | Futagami et al. |
| 6,766,946 B2 | 7/2004 | Iida et al. |
| 6,804,346 B1 | 10/2004 | Mewhinney |
| 6,845,448 B1 | 1/2005 | Chaganti et al. |
| 6,857,073 B2 | 2/2005 | French et al. |
| 6,907,408 B2 | 6/2005 | Angel |
| 6,908,030 B2 | 6/2005 | Rajasekaran et al. |
| 6,910,624 B1 | 6/2005 | Natsuno |
| 6,934,858 B2 | 8/2005 | Woodhill |
| 6,950,858 B2 | 9/2005 | Ogami |
| 6,983,379 B1 | 1/2006 | Spalink et al. |
| 6,983,381 B2 | 1/2006 | Jerdonek |
| 6,985,887 B1 | 1/2006 | Sunstein et al. |
| 6,988,085 B2 | 1/2006 | Hedy |
| 7,028,013 B2 | 4/2006 | Saeki |
| 7,059,531 B2 | 6/2006 | Beenau et al. |
| 7,121,471 B2 | 10/2006 | Beenau et al. |
| 7,154,375 B2 | 12/2006 | Beenau et al. |
| 7,234,156 B2 | 6/2007 | French et al. |
| 7,234,160 B2 | 6/2007 | Vogel et al. |
| 7,237,267 B2 | 6/2007 | Rayes et al. |
| 7,246,067 B2 | 7/2007 | Austin et al. |
| 7,303,120 B2 | 12/2007 | Beenau et al. |
| 7,310,611 B2 | 12/2007 | Shibuya et al. |
| 7,314,167 B1 | 1/2008 | Kiliccote |
| 7,343,149 B2 | 3/2008 | Benco |
| 7,389,913 B2 | 6/2008 | Starrs |
| 7,433,864 B2 | 10/2008 | Malik |
| 7,444,414 B2 | 10/2008 | Foster et al. |
| 7,451,113 B1 | 11/2008 | Kasower |
| 7,460,857 B2 | 12/2008 | Roach, Jr. |
| 7,478,157 B2 | 1/2009 | Bohrer et al. |
| 7,490,356 B2 | 2/2009 | Lieblich et al. |
| 7,503,489 B2 | 3/2009 | Heffez |
| 7,509,117 B2 | 3/2009 | Yum |
| 7,529,698 B2 | 5/2009 | Joao |
| 7,548,886 B2 | 6/2009 | Kirkland et al. |
| 7,575,157 B2 | 8/2009 | Barnhardt et al. |
| 7,581,112 B2 | 8/2009 | Brown et al. |
| 7,587,366 B2 | 9/2009 | Grim, III et al. |
| 7,603,701 B2 | 10/2009 | Gaucas |
| 7,606,725 B2 | 10/2009 | Robertson et al. |
| 7,620,596 B2 | 11/2009 | Knudson et al. |
| 7,623,844 B2 | 11/2009 | Herrmann et al. |
| 7,653,600 B2 | 1/2010 | Gustin |
| 7,689,487 B1 | 3/2010 | Britto et al. |
| 7,689,505 B2 | 3/2010 | Kasower |
| 7,690,032 B1 | 3/2010 | Peirce |
| 7,698,445 B2 | 4/2010 | Fitzpatrick et al. |
| 7,708,190 B2 | 5/2010 | Brandt et al. |
| 7,739,139 B2 | 6/2010 | Robertson et al. |
| 7,747,494 B1 | 6/2010 | Kothari et al. |
| 7,761,384 B2 | 7/2010 | Madhogarhia |
| 7,761,568 B1 | 7/2010 | Levi et al. |
| 7,765,311 B2 | 7/2010 | Itabashi et al. |
| 7,769,696 B2 | 8/2010 | Yoda |
| 7,769,697 B2 | 8/2010 | Fieschi et al. |
| 7,774,270 B1 | 8/2010 | MacCloskey |
| 7,797,725 B2 | 9/2010 | Lunt et al. |
| 7,802,104 B2 | 9/2010 | Dickinson |
| 7,827,115 B2 | 11/2010 | Weller et al. |
| 7,841,008 B1 | 11/2010 | Cole et al. |
| 7,849,014 B2 | 12/2010 | Erikson |
| 7,853,493 B2 | 12/2010 | DeBie et al. |
| 7,865,958 B2 | 1/2011 | Lieblich et al. |
| 7,970,679 B2 * | 6/2011 | Kasower ........................ 705/35 |
| 7,979,908 B2 | 7/2011 | Millwee |
| 8,060,424 B2 | 11/2011 | Kasower |
| 8,095,458 B2 | 1/2012 | Peterson et al. |
| 8,127,986 B1 | 3/2012 | Taylor et al. |
| 8,234,498 B2 | 7/2012 | Britti et al. |
| 8,355,967 B2 | 1/2013 | Debie et al. |
| 8,442,886 B1 * | 5/2013 | Haggerty et al. ............... 705/35 |
| 2001/0001877 A1 | 5/2001 | French et al. |
| 2001/0049620 A1 | 12/2001 | Blasko |
| 2002/0004736 A1 | 1/2002 | Roundtree et al. |
| 2002/0026519 A1 | 2/2002 | Itabashi et al. |
| 2002/0035684 A1 | 3/2002 | Vogel et al. |
| 2002/0069122 A1 | 6/2002 | Yun et al. |
| 2002/0099635 A1 | 7/2002 | Guiragosian |
| 2002/0111816 A1 | 8/2002 | Lortscher et al. |
| 2002/0128962 A1 | 9/2002 | Kasower |
| 2002/0157029 A1 | 10/2002 | French et al. |
| 2002/0169747 A1 | 11/2002 | Chapman et al. |
| 2003/0009418 A1 | 1/2003 | Green et al. |
| 2003/0009426 A1 | 1/2003 | Ruiz-Sanchez |
| 2003/0061163 A1 | 3/2003 | Durfield |
| 2003/0097342 A1 | 5/2003 | Whittingtom |
| 2003/0177028 A1 | 9/2003 | Cooper et al. |
| 2003/0182214 A1 | 9/2003 | Taylor |
| 2004/0006488 A1 | 1/2004 | Fitall et al. |
| 2004/0015714 A1 | 1/2004 | Abraham et al. |
| 2004/0044739 A1 | 3/2004 | Ziegler |
| 2004/0078324 A1 | 4/2004 | Lonnberg et al. |
| 2004/0123162 A1 | 6/2004 | Antell et al. |
| 2004/0138994 A1 * | 7/2004 | DeFrancesco et al. ......... 705/38 |
| 2004/0139025 A1 | 7/2004 | Coleman |
| 2004/0153521 A1 | 8/2004 | Kogo |
| 2004/0158523 A1 | 8/2004 | Dort |
| 2004/0243518 A1 | 12/2004 | Clifton et al. |
| 2004/0243832 A1 | 12/2004 | Wilf et al. |
| 2005/0005168 A1 | 1/2005 | Dick |
| 2005/0027995 A1 | 2/2005 | Menschik et al. |
| 2005/0055231 A1 | 3/2005 | Lee |
| 2005/0097320 A1 | 5/2005 | Golan et al. |
| 2005/0144452 A1 | 6/2005 | Lynch et al. |
| 2005/0154664 A1 | 7/2005 | Guy et al. |
| 2005/0166262 A1 | 7/2005 | Beattie et al. |
| 2005/0256809 A1 | 11/2005 | Sadri |
| 2005/0273442 A1 | 12/2005 | Bennett et al. |
| 2006/0010487 A1 | 1/2006 | Fierer et al. |
| 2006/0032909 A1 | 2/2006 | Seegar |
| 2006/0036870 A1 | 2/2006 | Dasari et al. |
| 2006/0059110 A1 | 3/2006 | Madhok et al. |
| 2006/0074986 A1 | 4/2006 | Mallalieu et al. |
| 2006/0080263 A1 | 4/2006 | Willis et al. |
| 2006/0129481 A1 | 6/2006 | Bhatt et al. |
| 2006/0131390 A1 | 6/2006 | Kim |
| 2006/0155573 A1 | 7/2006 | Hartunian |
| 2006/0161435 A1 | 7/2006 | Atef et al. |
| 2006/0173776 A1 | 8/2006 | Shalley et al. |
| 2006/0184440 A1 | 8/2006 | Britti et al. |
| 2006/0204051 A1 | 9/2006 | Holland, IV |
| 2006/0218407 A1 | 9/2006 | Toms |
| 2006/0239512 A1 | 10/2006 | Petrillo |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0277092 A1 | 12/2006 | Williams |
| 2007/0005508 A1 | 1/2007 | Chiang |

(56) References Cited

U.S. PATENT DOCUMENTS

| | | |
|---|---|---|
| 2007/0022297 A1 | 1/2007 | Britti et al. |
| 2007/0038483 A1 | 2/2007 | Wood |
| 2007/0038497 A1 | 2/2007 | Britti et al. |
| 2007/0124256 A1 | 5/2007 | Crooks et al. |
| 2007/0174186 A1 | 7/2007 | Hokland |
| 2007/0244807 A1 | 10/2007 | Andringa et al. |
| 2007/0250459 A1 | 10/2007 | Schwarz et al. |
| 2007/0261114 A1 | 11/2007 | Pomerantsev |
| 2007/0288360 A1 | 12/2007 | Seeklus |
| 2008/0010206 A1 | 1/2008 | Coleman |
| 2008/0010687 A1 | 1/2008 | Gonen et al. |
| 2008/0033742 A1 | 2/2008 | Bernasconi |
| 2008/0052244 A1 | 2/2008 | Tsuei et al. |
| 2008/0066188 A1 | 3/2008 | Kwak |
| 2008/0071682 A1 | 3/2008 | Dominguez |
| 2008/0077526 A1 | 3/2008 | Arumugam |
| 2008/0086759 A1 | 4/2008 | Colson |
| 2008/0103800 A1 | 5/2008 | Domenikos et al. |
| 2008/0109875 A1 | 5/2008 | Kraft |
| 2008/0114670 A1 | 5/2008 | Friesen |
| 2008/0115191 A1 | 5/2008 | Kim et al. |
| 2008/0126233 A1 | 5/2008 | Hogan |
| 2008/0162317 A1 | 7/2008 | Banaugh et al. |
| 2008/0175360 A1 | 7/2008 | Schwarz et al. |
| 2008/0183480 A1 | 7/2008 | Carlson et al. |
| 2008/0195548 A1 | 8/2008 | Chu et al. |
| 2008/0205655 A1 | 8/2008 | Wilkins et al. |
| 2008/0208873 A1 | 8/2008 | Boehmer |
| 2008/0255992 A1 | 10/2008 | Lin |
| 2008/0263058 A1 | 10/2008 | Peden |
| 2008/0270209 A1 | 10/2008 | Mauseth et al. |
| 2008/0281737 A1 | 11/2008 | Fajardo |
| 2008/0288283 A1 | 11/2008 | Baldwin, Jr. et al. |
| 2008/0306750 A1 | 12/2008 | Wunder et al. |
| 2008/0319889 A1 | 12/2008 | Hammad |
| 2009/0031426 A1 | 1/2009 | Dal Lago et al. |
| 2009/0037332 A1 | 2/2009 | Cheung et al. |
| 2009/0043691 A1 | 2/2009 | Kasower |
| 2009/0055894 A1 | 2/2009 | Lorsch |
| 2009/0094674 A1 | 4/2009 | Schwartz et al. |
| 2009/0106141 A1 | 4/2009 | Becker |
| 2009/0106150 A1 | 4/2009 | Pelegero et al. |
| 2009/0138335 A1 | 5/2009 | Lieberman |
| 2009/0144166 A1 | 6/2009 | Dickelman |
| 2009/0150166 A1 | 6/2009 | Leite et al. |
| 2009/0150238 A1 | 6/2009 | Marsh et al. |
| 2009/0177529 A1 | 7/2009 | Hadi |
| 2009/0177562 A1 | 7/2009 | Peace et al. |
| 2009/0199264 A1 | 8/2009 | Lang |
| 2009/0210241 A1 | 8/2009 | Calloway |
| 2009/0254476 A1 | 10/2009 | Sharma et al. |
| 2009/0254971 A1 | 10/2009 | Herz et al. |
| 2009/0260064 A1 | 10/2009 | Mcdowell et al. |
| 2009/0307778 A1 | 12/2009 | Mardikar |
| 2009/0328173 A1 | 12/2009 | Jakobson et al. |
| 2010/0011428 A1 | 1/2010 | Atwood et al. |
| 2010/0030677 A1 | 2/2010 | Melik-Aslanian et al. |
| 2010/0043055 A1 | 2/2010 | Baumgart |
| 2010/0049803 A1 | 2/2010 | Ogilvie et al. |
| 2010/0100945 A1 | 4/2010 | Ozzie et al. |
| 2010/0114744 A1 | 5/2010 | Gonen |
| 2010/0114747 A1 | 5/2010 | Kasower |
| 2010/0114776 A1 | 5/2010 | Weller et al. |
| 2010/0145840 A1 | 6/2010 | Kasower |
| 2010/0179906 A1 | 7/2010 | Hawkes |
| 2010/0205662 A1 | 8/2010 | Ibrahim et al. |
| 2010/0229245 A1 | 9/2010 | Singhal |
| 2010/0241535 A1 | 9/2010 | Nightengale et al. |
| 2010/0250411 A1 | 9/2010 | Ogrodski |
| 2010/0280914 A1 | 11/2010 | Carlson |
| 2010/0299262 A1 | 11/2010 | Handler |
| 2010/0325694 A1 | 12/2010 | Bhagavatula et al. |
| 2010/0332393 A1 | 12/2010 | Weller et al. |
| 2011/0016533 A1 | 1/2011 | Zeigler et al. |
| 2011/0035788 A1 | 2/2011 | White et al. |
| 2011/0161218 A1* | 6/2011 | Swift ............................. 705/35 |
| 2011/0184838 A1 | 7/2011 | Winters et al. |
| 2012/0017266 A1 | 1/2012 | DiChiara et al. |
| 2012/0095894 A1* | 4/2012 | Campbell et al. .............. 705/35 |
| 2012/0108274 A1* | 5/2012 | Acebo Ruiz et al. ......... 455/466 |
| 2013/0018811 A1 | 1/2013 | Britti et al. |
| 2013/0031624 A1 | 1/2013 | Britti et al. |
| 2013/0211986 A1 | 8/2013 | Debie et al. |

OTHER PUBLICATIONS

CreditSesame; "Promote Your Financial Responsibility to Get an Edge in Life"; http://www.creditsesame.com/credit-badge/ printed Dec. 2, 2011 in 1 page.

Ettorre, Paul Kahn on Exceptional Marketing, Management Review, vol. 38(11), Nov. 1994, pp. 48-51.

Ideon, Credit-Card Registry that Bellyflopped this Year, is Drawing some Bottom-Fishers, The Wall Street Journal, Aug. 21, 1995, pp. C2.

Li et al., "Automatic Verbal Information Verification for User Authentication", IEEE Transactions on Speech and Audio Processing, vol. 8, No. 5, Sep. 2000, pp. 585-596.

* cited by examiner

SYSTEMS AND METHODS FOR PERMISSION ARBITRATED TRANSACTION SERVICES

CROSS-REFERENCE TO RELATED APPLICATIONS

This application is a continuation-in-part of U.S. patent application Ser. No. 13/175,401, filed Jul. 1, 2011, which claims the benefit of U.S. Provisional Application No. 61/360,904, filed Jul. 1, 2010 and titled SYSTEMS AND METHODS FOR PERMISSION ARBITRATED TRANSACTION SERVICES, both of which are hereby incorporated by reference in their entirety herein. This application also claims the benefit of both U.S. provisional Application No. 61/527,573, filed Aug. 25, 2011, and U.S. provisional Application No. 61/541,936, filed Sep. 30, 2011, which are each hereby incorporated by reference in their entirety herein.

BACKGROUND

This disclosure generally relates to accessing personal information, and more particularly to systems and methods for permission arbitrated transaction services relating to personal information.

BRIEF DESCRIPTION OF THE DRAWINGS

Specific embodiments will now be described with reference to the following drawings.

FIG. 2A illustrates a first portion of the method, based on an initiation by a requesting party, FIG. 2B illustrates the first portion of the method based on an initiation by a permitting party, FIG. 2C is illustrates a second portion of the embodiment of a method of arbitrating access to personal information.

DESCRIPTION OF THE EMBODIMENTS

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions described herein.

Example Computing System

Figure 1:
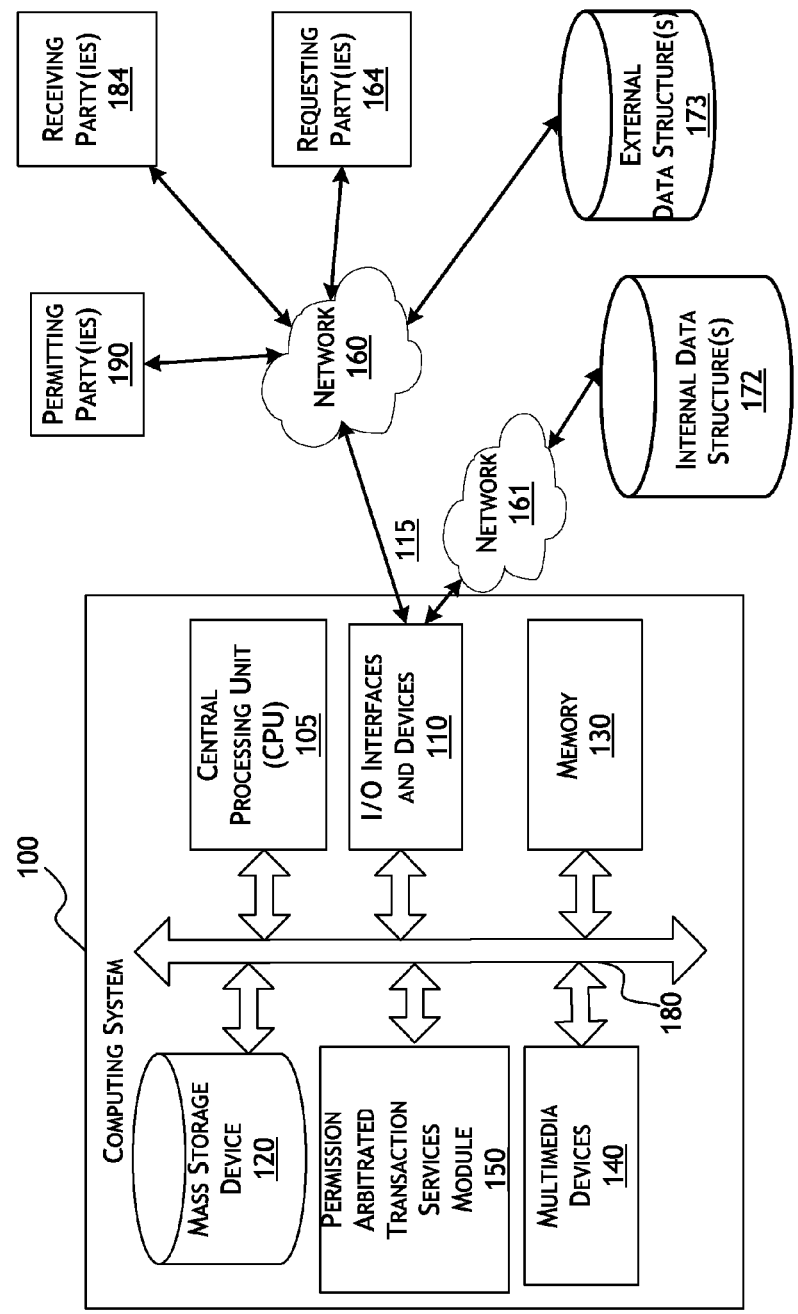
FIG. 1 illustrates one embodiment of a block diagram of a computer system for arbitrating access to personal information.

In some embodiments, the systems, computer clients and/or servers described below take the form of a computing system as shown in FIG. 1. FIG. 1 is a block diagram showing an embodiment in which the computing system 100 is in communication with a network 160 and various systems are also in communication with the network 160. The computing system 100 may be used to implement systems and methods described herein. For example, the computing system 100 may be configured to receive requests for personal information and generate outputs corresponding to the type of information requested. In some embodiments, the system is accessed remotely by a client, the system is local to the client, and/or a combination of the two. One example client may be an individual or a business that uses the systems and methods to request access to another individual's personal information, such as information that is indicative of character attributes of the individual.

The terms "individual," "consumer," "customer," "people," "persons," "party," "entity," and the like, whether singular or plural, should be interpreted to include either individuals or groups of individuals, such as, for example, married couples or domestic partners, organizations, groups, business entities, and other entities.

The computing system 100 includes, for example, a personal computer that is IBM, Macintosh, or Linux/Unix compatible. In one embodiment, the computing system 100 comprises a server, a laptop computer, a cell phone, a personal digital assistant, a kiosk, or an audio player, for example. In one embodiment, the exemplary computing system 100 includes a central processing unit (CPU) 105, which may include a conventional microprocessor. The computing system 100 further includes a memory 130, such as random access memory (RAM) for temporary storage of information and a read only memory (ROM) for permanent storage of information, and a mass storage device 120, such as a hard drive, diskette, or optical media storage device. Typically, the modules of the computing system 100 are connected to the computer using a standard based bus system 180. In different embodiments, the standard based bus system 180 could be Peripheral Component Interconnect (PCI), Microchannel, Small Computer System Interface (SCSI), Industrial Standard Architecture (ISA) and Extended ISA (EISA) architectures, for example. In addition, the functionality provided for in the components and modules of the computing system 100, which is also referred to herein as the permission arbitrated transaction services system 100 or simply the PATS system 100, may be combined into fewer components and modules or further separated into additional components and modules.

The computing system 100 is generally controlled and coordinated by operating system software, such as Windows 95, Windows 98, Windows NT, Windows 2000, Windows XP, Windows Vista, Unix, Linux, SunOS, Solaris, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface (GUI), among other things.

The exemplary computing system 100 includes one or more commonly available input/output (I/O) devices and interfaces 110, such as a keyboard, mouse, touchpad, and printer. In one embodiment, the I/O devices and interfaces 110 include one or more display device, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 1, the I/O devices and interfaces 110 provide a communication interface to various external devices. In the embodiment of FIG. 1, the computing system 100 is electronically coupled to a network 160, which comprises one or more of a LAN, WAN, or the Internet, for example, via a wired, wireless, or combination of wired and wireless, communication link 115. The network 160 communicates with various computing devices and/or other electronic devices via wired or wireless communication links.

In addition to the devices that are illustrated in FIG. 1, the network 160 may communicate with other data sources or other computing devices. In addition, the data sources may include one or more internal and/or external data sources. In some embodiments, one or more of the data structures or data sources may be implemented using a relational database, such as Sybase, Oracle, CodeBase and Microsoft® SQL Server as well as other types of data structures such as, for example, a flat file data structure, an entity-relationship data structure, and object-oriented data structure, and/or a record-based data structure.

In the embodiment of FIG. 1, the computing system 100 is coupled to a secured network 160, such as a secured LAN, for example. The system communicates with the internal data structure(s) 172 and external data structure(s) 173. In some embodiments, the system 100 may communicate with the internal data structure 172 via a secured network 161, such as a secured LAN. In some embodiments, the internal data structure(s) 172 and the external data structure 173 may be configured to communicate with additional computing devices over the networks 160, 161 and/or some other network, such as a LAN, WAN, or the Internet via a wired, wireless, or combination of wired and wireless, communication link.

In the embodiment of FIG. 1, the computing system 100 also includes a permission arbitrated transactions services ("PATS") module 150 that may be executed by the CPU 105. For example, the computing system 100 may be configured to execute the PATS module 150, among others, in order to provide information based on data in internal data structure(s) 172 and/or external data structure(s) 173, as explained in further detail below. The sources of the data accessed may include consumer information available to a credit bureau such as credit profile data, demographic data, marketing data, credit scores, marketing scores, behavioral scores, inferred data, and the like, and any third party data to which the credit bureau may have access. The sources of data may also include consumer-provided data such as preferences, interests, affinity, desires, behavioral data, transactional data such as purchases, and any other self-defined or personally created data. In various embodiments, such data may be available on one or more of the internal data structure(s) 172 and/or external data structure(s) 173.

FIG. 1 also illustrates a requesting party 164 that is in communication with the network 160. The requesting party may be any entity that desires information regarding another entity. For example, a landlord may be a requesting party that desires information regarding potential tenants. In one embodiment, the computing system 100 provides an arbitration service between requesting parties and parties from which personal information is requested. For example, the requesting party 164 may request data related to another entity (a permitting party 190). The permitting party 190 may provide permission to the computing system 100 to grant the requesting party 164 access to certain information regarding the permitting party. As another example, the permitting party 190 may provide permission to the computing system 100 to make information available to a receiving party 184, without the receiving party 184 first requesting access to the information. Thus, the permitting party 190 can selectively allow personal information to be provided to various entities in response to specific requests for information (e.g., in response to a request from the requesting party 164) or without requests from parties (e.g., information may be made available to the requesting party 164). In various embodiments, some of the parties 164, 184 and 190 may overlap with one another. In various embodiments, the receiving party 184 may include various types of entities. For example, the receiving party 184 may also be the permitting party 190 (for example, a consumer may provide authorization rules that permit sending of personal information to the consumer on a periodic basis), a third party distinct the permitting party 190, a credit bureau, an information service provider, a financial institution, or a party that stores and maintains personal information on the permitting party 190. Depending on the embodiment, the parties 190, 164 and 184 may be unknown/anonymous to each other. In yet other embodiments, the parties 190, 164 and 184 may be partially known to each other, such as through a user name or a screen name on a social networking site, or a URL name, for example. In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

It is recognized that the term "remote" may include data, objects, devices, components, and/or modules not stored locally, that is not accessible via the local bus. Thus, remote data may include a device which is physically stored in the same room and connected to the computing system via a network. In other situations, a remote device may also be located in a separate geographic area, such as, for example, in a different location, country, and so forth.

In one embodiment, the computing system 100 may allow a user, also referred to as the permitting party 190, to share the user's personal information with another party, such as the receiving party 184. The receiving party 184 may then use the information to authenticate the permitting party 190, assess information associated with the permitting party 190, determine if the permitting party 190 is compatible with one or more other users associated with the receiving party 184, validate the permitting party 190, and so forth. The permitting party 190 may define how much of the permitting party 190's personal information is shared, and/or limit the use of the information for one or more specific purposes. Personal information may include any information associated with an entity, such as information that may be used for purpose of one or more of authentication, assessment, compatibility, legitimacy and validation. Requesting parties and/or receiving parties may also request, and be provided access to via the computing system 100, non-personal aggregate attributes, such as for the purpose of enabling the use of summarized attributes in areas such as website advertising, for example.

Similarly, a requesting party 164 may set up criteria for the types of information it wants to review along with the intended use of the information. The requesting party 164 may also provide a system that enables permitting parties 190 the ability to grant the requesting party 164 access to the requested information. This access may be direct or via a gateway.

As one example, a requesting party 164 may be the Smith family, which is looking to hire a home nurse to watch over the family's aging grandmother. The Smith family can then decide that it would like to review credit information, criminal background information, and general demographic information of potential home nurse applicants. One such potential home nurse applicant may be Jane Jones. The Smith family may provide information to the computing system 100, and more particularly, to the PATS module 150, requesting certain personal information regarding Jane Jones. For example, the Smith family may access a website that is controlled by the provider of the PATS module 150 in order to provide a request for information regarding Jane Jones. The requested may be provided via any available user interface elements, and may include various options for payment for provision of the personal information. Alternatively, the request for information regarding an individual may be communicated to the computing system 100 in any other manner, such as via SMS message, email message, phone call, letter, or other In this embodiment, Jane Jones, a home health nurse, who is looking for a new patient, is the permitting party 190, that is provided an opportunity to permit the Smith family (the requesting party 164) to access certain of her personal information. In one embodiment, Ms. Jones is notified of a request for personal information in one or more of various manners, such as an SMS message, email message, letter, phone call, or an alert in an online portal, such as a credit monitoring portal of which Mr. Jones is a member. Thus, Jane Jones can utilize the system 100 to permit the Smith family to review her personal information, and the Smith family can use the system 100 to determine that Jane Jones is looking for a new patient, receive information verifying whether Jane Jones is who she says she is, and receive information from the computing system 100 about Jane Jones' credit history, criminal background and/or any other requested information.

As another example, nurse Jack Brown may be another nurse looking for potential patients to take care of. As the permitting party 190, Jack Brown may provide information to the computing system 100, and more particularly, to the PATS module 150, indicating agreement to make certain of his personal information, such as his credit history and criminal background information, available to certain receiving parties 184, which may be families looking to hire a home nurse. Thus, Jack Brown can utilize the system 100 to permit receiving parties 184 to review his personal information. One such family, the Doe family, which is qualified as a receiving party 184 based on criteria provided by Jack Brown (the permitting party 190), can access information over a network 160 to determine that Jack Brown is looking for a new patient and receive information from the computing system 100 about Jack Brown's credit history and criminal background.

Credit data as well as public records, demographics such as, for example, age, and aggregated attributes relating to credit data may be enabled for scalable distribution into digital and non-digital platforms. Permission arbitrated transaction services systems and methods disclosed herein may enable such scalable distribution through various web properties, utilizing permission-based handshakes, an open web framework and/or architecture, transformation layers and authentication rules. Website developers or others may utilize an API/SDK framework to write to the computing system 100. Such a PATS system 100 may accept common request and delivery types such as XML (world-wide web), SMS (mobile technology), and the like, over secure channels (such as https for example), using common web services (such as REST and SOAP, for example).

Embodiments of the permission arbitrated transaction services systems and methods may leverage a variety of possible interactions between parties to present potential opportunities for character and personal assessment between two or more parties 164, 184 and 190. Some example interactions include tenant screening, social networks and matchmaking, hiring and employment, electronic exchanges, searching for caregivers, client screening, background checks. Credit data as well as public records, demographics such as, for example, age, and aggregated attributes relating to credit data may be transformed, using the permission arbitrated transaction services ("PATS") system 100, into a broad consumable language where required, in order to provide parties with new standards for assessment of other parties' character, compatibility, employability, and the like. In various embodiments, the PATS system may be operated by a credible and trusted entity acting as an arbitrator between the various parties. In some embodiments, the PATS system may be operated by a credit bureau.

Some embodiments of the permission arbitrated transaction services systems and methods may also enable entities, such as small business owners, with a simplified mechanism for accessing personal information of entities. Typically, business owners undergo extensive verification processes (including site visits for example) in order to be authorized to access credit data. The permission arbitrated transaction services may speed up this process by performing the necessary validation electronically and/or online in real-time to allow the small business owners quicker access to credit data.

Embodiments of the PATS system 100 may be implemented as a data-as-a-service model. Such a model includes standardized processes for accessing data "where it lives"—the actual platform on which the data resides does not matter. For data-as-a-service, the consumption of resources may be determined by the buyer/customer/user on an as-needed basis, and may utilize web services or cloud computing. Applications and methods of access to a data-as-a-service model may vary depending on the type of information requested, primarily due to statutory requirements and governing regulations relating to the information.

The table below lists some of the potential features of a PATS system 100.

skipped in requests for personal information by that particular requesting party 64. For example, a landlord may select a default purpose of determining credibility that should be used with subsequent request for personal information by the landlord using the PATS system 100.

Moving to block 230, the PATS system 100 may optionally receive an additional purpose. In various embodiments, the additional purpose may be that the data be used only for social networking purposes, for rental screening purposes, and the like. Additionally, the system 100 may receive details such as when the data is needed (for example, as a one-time transaction or as part of batch processing) and whether the data should be transformed in any way. In some embodiments, the requesting party 164 can provide preferences for one or more of the above tasks in blocks 220 and 230 such that those tasks

TABLE 1

| Market | Major Features | Platform | Client Interface | Server | Pricing Model |
|---|---|---|---|---|---|
| US Consumers/Businesses digital networks, social networks, employment sites, match making sites, and similar | Data-as-a-service platform and application layer(s) to enable aggregated statistics and permission actuated access for assessments of authentication, legitimacy, and character/background (P2P, B2C, Web) | Web services/ custom solutions | Browser application and/or XML integration | Web server | Transaction and Revenue Share |

Figure 2A:
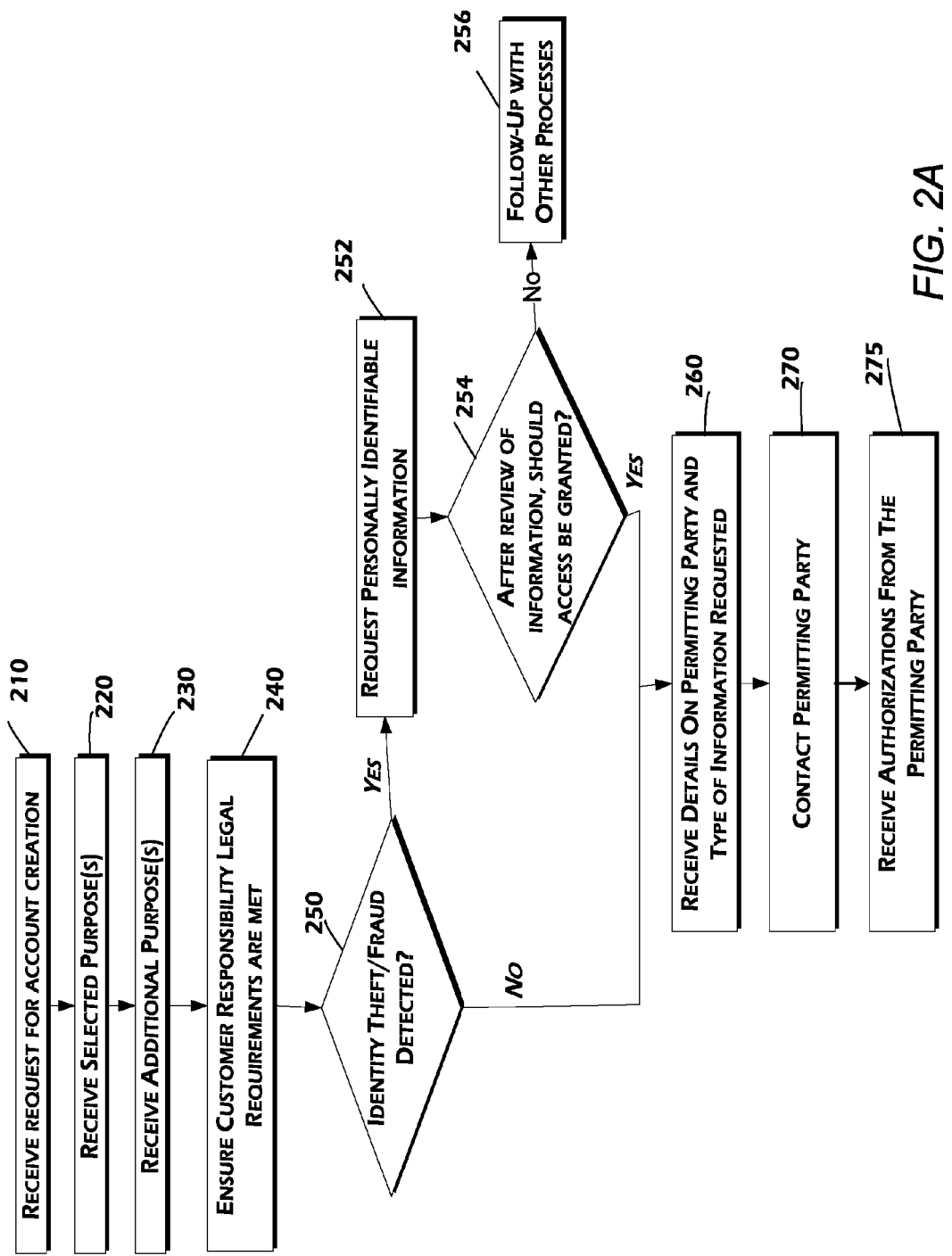
FIGS. 2A-2C are flowcharts illustrating an embodiment of a method of arbitrating access to personal information.
Figure 2B:
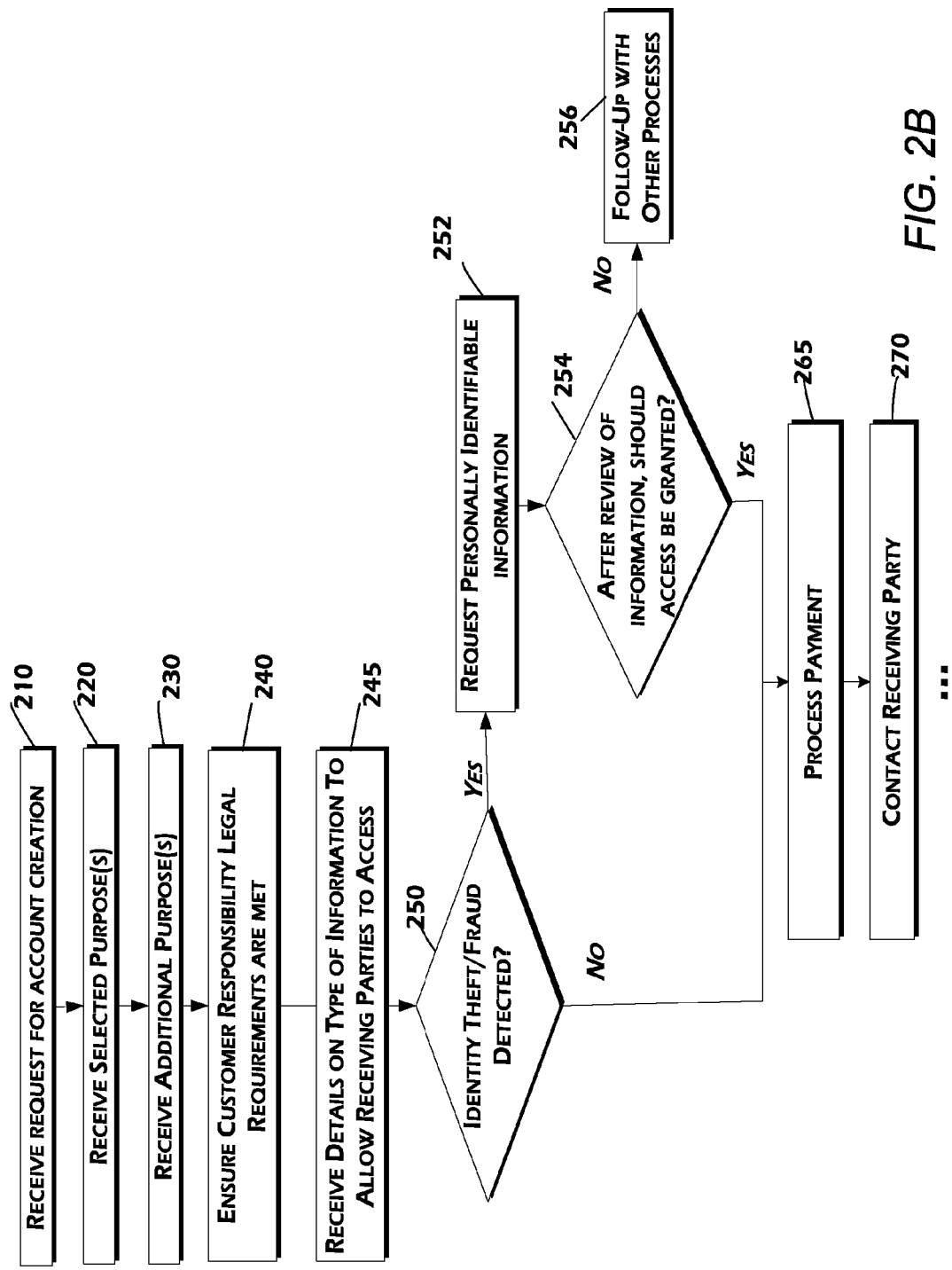
Figure 2C:
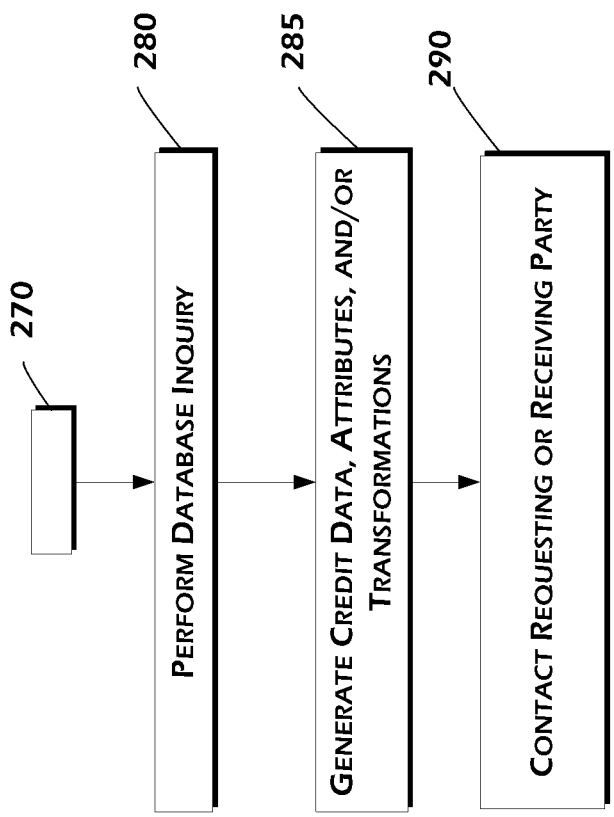

FIG. 2 (FIGS. 2A, 2B, and 2C) is a flowchart illustrating one embodiment of a method of arbitrating access to personal information of a permitting party. Depending on the embodiment, the method of FIG. 2 may include fewer or additional blocks and/or the blocks may be performed in a different order than is illustrated. Software code configured for execution on a computing device in order to perform the method of FIG. 2 may be provided on a computer readable medium, such as a compact disc, digital video disc, flash drive, or any other tangible medium. Such software code may be stored, partially or fully, on a memory device of the computer, such as the memory 130 (FIG. 1), in order to perform the method outlined in FIG. 2. For ease of explanation, the method will be described herein as performed by a PATS system 100; however, the method may be performed by any other suitable computing device.

FIG. 2A illustrates a first portion of the method, based on an initiation by a requesting party 164. Beginning in block 210, the PATS system 100 receives a request for account creation by a requesting party 164. In various embodiments, the request for account creation may include information about the requesting party 164 including one or more of: a name, an address, a date of birth, a driver's license number, a social security number, employer name, tax identification number, phone number, and the like. If the requesting party 164 has already established an account with the PATS system 100, block 210 may be simplified such that the requesting party 164 provides login/authentication information. For example, the requesting party 164 may provide a username and password that is usable by the PATS system 100 to identify the particular requesting party.

Next, in block 220, the PATS system 100 receives a selected purpose from the requesting party 164. In various embodiments, the selected purpose may be one or more of compatibility, assessment, authentication, legitimacy, validation, and the like. In one embodiment, the requesting party 164 establishes a default purpose for requesting personal information of other entities, such that block 220 may be may be automated using the requesting party 164's default preferences. Thus, blocks 220 and 230 may not be individually performed for each request from a requesting party 164.

Next, in block 240, the PATS system 100 ensures that the requesting party 164 complies with and accepts any legal requirements for customer responsibility. Such requirements may include one or more of: obtaining acceptance and an electronic signature from the requesting party 164, receiving payment details such as credit card information from the requesting party 164, or other legal consent information. The requesting party 164 may be asked by the system 100 to provide evidence of written instruction. Such written instruction may include an electronic signature as defined by the ESIGN Act, or any other method that governing bodies may approve as adequate proof.

The PATS system 100 may then use the payment details to process payment for the account creation fee. In some embodiments, the payment model for the PATS system 100 may be transactional. In other embodiments, it may be by batch. The payment method may be by credit, by debit, by PayPal™ account, and the like. Payment for a transaction may be received from the requesting party 164, from the permitting party 190, or both.

Next, in block 250, the PATS system 100 verifies whether there may be identity theft or some other form of fraud, based on the information received by the requesting party 164. The parties' identities may be verified using a variety of authentication and fraud detection techniques by the PATS system 100. Regardless of the result of this verification, the PATS system 100 may store the details of the transaction(s) with the requesting party 164 in a device such as mass storage device 120, for example, in order to enable comprehensive tracking of each transaction. The requesting party 164 may also be asked to affirmatively accept or reject clear and conspicuous instructions to support, defend or refute that the transaction was requested. Details of the transaction(s) may include IP address, transaction time, originating source (for example, member number, third party website/partner, and reseller identification), data with respect to the requesting party 164's actions (such as, for example, obligation and responsibilities acceptance, e-signature, and acknowledgments of instructions).

If the PATS system 100 detects identity theft or fraud, then, at block 252, the system 100 may request a fax of personally identifiable information from the requesting party 164, and any other information relating to the additional purpose received at block 230. If the system 100 receives such information (the system 100 may or may not receive such requested information) from the requesting party 164, then at block 254, the information is reviewed, and if the information is verified, the method continues to block 260. In one embodiment, if the information is verified (e.g., the requesting party is authenticated), a message with a traceable and/or encrypted message and/or link may be sent to the requesting party 164's location (which may be, for example, an email address, a social networking username, and/or a mobile phone reached by an SMS), where the link is usable to continue with the request for personal information. If the system 100 determines that the requesting party 164 cannot be authenticated based on the received information, or if personally identifiable information is not received, the method continues to block 256 where follow up with the requesting party 164 using standard membership processes for suspicious account handling may be performed.

If the PATS system 100 does not detect identity theft or fraud at block 250, or if there was a suspicion of theft or fraud but the personally identifiable information was verified at block 254, then, at block 260, the system 100 may receive information regarding the targeted permitting party 190 from the receiving party 164, as well as the type of product to request regarding the permitting party 190. In various embodiments, the information regarding the permitting party 190 may include one or more of the permitting party 190's email address, name, address, date of birth, driver's license number, employer name, income, and the like. In various embodiments, the type of information regarding the permitting party 190 that is requested may include one or more of: a credit score, a credit profile with a decision, a full credit profile with personally identifiable information removed, a credit profile with some information removed, information regarding the character of permitting party 190, and the like. In some embodiments, the authentication blocks 210-250 may be performed in another manner, possibly by another entity that specializes in authentication. Authentication performed by the PATS system 100 and/or the other entity may include one or more of several authentication techniques known to one skilled in the art. Thus, in some embodiments, a process of requesting personal information of an entity that is executed by the PATS system 100 begins with block 260 of FIG. 2A.

Next, at block 270, the PATS system 100 may use the details regarding the permitting party 190 to contact the permitting party 190. In some embodiments, the PATS system 100 may have access to further contact information regarding the permitting party 190 that may not be available to the requesting party 164. For example, the requesting party 164 may not have an e-mail address of the permitting party 190, but the PATS system 100 may determine the e-mail address of the permitting party 190 and communicate with the permitting party 190 via the e-mail address. For example, in a social networking scenario, the PATS system 100 may request and receive contact information of the permitting party from the social networking system, where the contact information is not available to requesting party 164. When the PATS system 100 communicates with the permitting party 190, information that at least partially identifies the requesting party 164 and details regarding the request are provided. In one embodiment, the permitting party 190 may initiate acceptance of the request by the requesting party 164, for example, by clicking an encrypted link, if received by email. In this way, the permitting party 190 may authorize or reject the request for information. In other embodiments, the permitting party may authorize/reject requests for access to personal information in any other manners, such as via a web interface, telephone call, email, or other means.

Next, at block 275, the permitting party 190 the permitting party may be given the ability to provide authorizations after being informed of a specific request for access to their information. The permitting party 190 may provide authorization to the system 100 for the requesting party 164 in any number of ways (including those discussed above). In some embodiments, the permitting party 190 may select portions of the requested information that the requesting party 164 is authorized to access.

In one embodiment, the permitting party 190 is also required to have an account with the PATS system 100, such as to authenticate that the permitting party really is the entity that the requesting party is seeking information from. Thus, the permitting party 190 may need to provide authentication information to the PATS system. For example, if the permitting party 190 has not previously set up an account with the PATS system 100, blocks 210-250, and if necessary, blocks 252-258, may be repeated for the permitting party 190. Depending on the embodiment, authentication of the permitting party 190 may be different than the required authentication for the requesting party 164. For example, the permitting party 190 may not need to provide as much authentication information as the requesting party 164, or vice versa.

During the set up of the account for the permitting party, or for a previously set-up account, the permitting party 190 may be asked at block 260 to provide permission for access to personal information, and to determine the type of information to make available to the requesting party 164. In various embodiments, the types of information available for request by the requesting party, and available to allow access to by the permitting party 190, may include one or more of: a credit score, a credit profile with a decision, a full credit profile with personally identifiable information removed, a credit profile with some information removed, and the like. Next, the method moves to block 280 (FIG. 2C) described further below.

FIG. 2B illustrates the first portion of the method based on an initiation by a permitting party 190, where personal information is to be made available to one or more receiving parties 184. Beginning in block 210, the PATS system 100 receives a request for account creation by a permitting party 190. In various embodiments, the request for account creation may include information about the permitting party 190 including one or more of: a name, an address, a date of birth, a driver's license number, a social security number, employer name, tax identification number, phone number, and the like.

Next, in block 220, the PATS system 100 receives a selected purpose from the permitting party 190. In various embodiments, the selected purpose may be one or more of compatibility, assessment, authentication, legitimacy, validation, and the like. In some embodiments, the PATS system 100 may also receive information from the permitting party 190 identifying one or more receiving parties 184 for which information may be made available. In other embodiments, the system 100 may receive information from the permitting party 190 identifying receiving parties 184 for which information may be restricted from being available.

Moving to block 230, the PATS system 100 may optionally receive an additional purpose. In various embodiments, the additional purpose may be that the data be used only for social networking purposes, for rental screening purposes, and the like. Additionally, the system 100 may receive details such as when the data is needed (for example, as a one-time transaction or as part of batch processing) and whether the data should be transformed in any way. In some embodiments, the permitting party 190 can provide preferences for one or more of the above tasks in blocks 220 and 230 such that those tasks may be automated using the permitting party 190's default preferences.

Next, in block 240, the PATS system 100 ensures that the permitting party 190 complies with and accepts any legal requirements for customer responsibility. Such requirements may include one or more of: obtaining acceptance and an electronic signature from the permitting party 190, receiving payment details such as credit card information from the permitting party 190, or other legal consent information. The permitting party 190 may be asked by the system 100 to provide evidence of written instruction. Such written instruction may include an electronic signature as defined by the ESIGN Act, or any other method that governing bodies may approve as adequate proof.

Then, in block 245, the PATS system 100 receives details about the type of information for which permission is granted by the permitting party 190 for the receiving part(ies) 184. In various embodiments, the type of product may include one or more of: a credit score, a credit profile with a decision, a full credit profile with personally identifiable information removed, a credit profile with some information removed, and the like.

Next, in block 250, the PATS system 100 verifies whether there may be identity theft or some other form of fraud, based on the information received by the permitting party 190. The parties' identities may also be verified using a variety of authentication and fraud detection techniques by the PATS system 100. Regardless of the result of this verification, the PATS system 100 may store the details of the transaction(s) with the permitting party 190 in a device such as mass storage device 120, for example, in order to enable comprehensive tracking of each transaction. The permitting party 190 may also be asked to affirmatively accept or reject clear and conspicuous instructions to support, defend or refute that the transaction was requested. Details of the transaction(s) may include IP address, transaction time, originating source (for example, member number, third party website/partner, and reseller identification), data with respect to the permitting party 190's actions (such as, for example, obligation and responsibilities acceptance, e-signature, and acknowledgments of instructions).

If the PATS system 100 detects identity theft or fraud, then, at block 252, the system 100 may request a fax of personally identifiable information from the permitting party 190, and any other information relating to the additional purpose received at block 230. If the system 100 receives such information from the permitting party 190, then at block 254, the information is reviewed, the method continues to block 260. In one embodiment, if the information is verified (e.g., the permitting party is authenticated), a message with a traceable and/or encrypted message and/or link may be sent to the permitting party 190's location (which may be, for example, an email address, a social networking username, and/or a mobile phone reached by an SMS), where the link is usable to further define details regarding access to the permitting party 190's personal information. If the system 100 determines that the permitting party 190 cannot be authenticated based on the received information, or if personally identifiable information is not received, the method continues to block 256 where follow up with the permitting party 190 using standard membership processes for suspicious account handling may be performed.

If the PATS system 100 does not detect identity theft or fraud at block 250, or if there was a suspicion of theft or fraud but the personally identifiable information was verified at block 254, then, at block 265, the PATS system 100 may use the payment details to process payment for the account creation fee, and/or for providing a product to a receiving party 184. In some embodiments, the payment model for the PATS system 100 may be transactional. In other embodiments, it may be by batch. The payment method may be by credit, by debit, by PayPal™ account, and the like. Payment for a transaction may be received by the requesting party 164, by the permitting party 190, or both. In some embodiments, the authentication blocks 210-250 may be performed in another manner, possibly by another entity that specializes in authentication. Thus, in some embodiments, a process of permitting use of personal information of an entity that is executed by the PATS system 100 begins with block 265 of FIG. 2B.

Next, at block 270, the PATS system 100 may contact one or more receiving party 184. In some embodiments, the PATS system 100 may have access to further contact information regarding the receiving party 184 that may not be available to the permitting party 190. For example, the permitting party 190 may not have an e-mail address of the receiving party 184, but the PATS system 100 may determine the e-mail address of the receiving party 184 and communicate with the receiving party 184 via the e-mail address. For example, in a social networking scenario, the PATS system 100 may request and receive contact information of the receiving party from the social networking system, where the contact information is not available to permitting party 190.

In one embodiment, the receiving party 184 is also required to have an account with the PATS system 100, such as to authenticate that the receiving party really is the entity to whom the permitting party has provided permission to access information. Thus, the receiving party 184 may need to provide authentication information to the PATS system. For example, if the receiving party 184 has not previously set up an account with the PATS system 100, blocks 210-250, and if necessary, blocks 252-258, may be repeated for the receiving party 184. Depending on the embodiment, authentication of the receiving party 184 may be different than the required authentication for the permitting party 190. For example, the receiving party 184 may not need to provide as much authentication information as the permitting party 190, or vice versa.

FIG. 2C is illustrates a second portion of the embodiment of a method of arbitrating access to personal information. Once the PATS system 100 has contacted the permitting party and received further authorizations if necessary at block 275 (FIG. 2A) or the receiving party at block 270 (FIG. 2B), then at block 280, the PATS system 100 performs a data structure inquiry to obtain the information requested by the requesting party 164 for which the permitting party 190 authorized access by the requesting party 164. In various embodiments, this data structure enquiry may include accessing data in internal credit data structure(s) 172 and/or one or more external data structure(s) 173.

Next, at block 285, the PATS system 100 generates credit bureau data, credit attributes, and/or transformation of such data in order to generate the a product including the information requested and/or permitted at blocks 245 or 260. In one embodiment, personal information is grouped into various products that may be authorized for release to requesting and/or permitting parties. For example, a credit report product may include the typical pieces of credit information, and information associated with the credit information, that is provided to consumers in credit reports. The type of information requested by a requesting party 164, and/or permitted by the permitting party 190 may vary. In some embodiments, the information may be, for example, header information included in a typical credit bureau report, which may be used for authentication. In other embodiments, the information may be, for example, a credit bureau profile, which may include the full profile, some credit scores, some credit attributes, and/or abstractions of the score and/or attributes.

In some embodiments, the information provide to requesting and/or receiving parties may be transformed from its original format. For example, an abstract representation of a credit score or decision may be rendered in the form of an expression, such as an icon that ranges from a smile to a frown, wherein the expression is representative of the credit score. For example, expressive face icons may be associated with credit score ranges so that a credit scores in the range of 780-820, for example, may be associated with a smiley face icon while credit scores in the range of 300-600 may be associated with a frowny face. Expressions may also include common connotations such as number of stars or degrees of moon fullness. Additionally, embodiments in the form of low-to-high scores and decisions may be abstracted in quantitative progressions, ranges and volumes and can be rendered as gauges, thermometers, speedometers and other meters, as well as in common chart formats such as pie charts, bar charts and sliders.

In yet other embodiments, the information may be demographics such as age, sex, location, and so forth. In some embodiments, the information may be education records. In other embodiments, the information may be public records such as liens and lawsuits, for example. In other embodiments, the information may be criminal records. In other embodiments, the information may include some other form of data and/or transformations of the other types of information listed above.

If the request for data comprises a soft inquiry, the permitting party 190 may acknowledge that they are sharing the result with the requesting party 164, and a transformed result (such as a score, for example, indicating a consumable grade such as "excellent") may be provided. If the request comprises a hard inquiry, the permitting party 190 may provide written authorization to the system 100 and by proxy to the requesting party 164. Such written authorization may need to conform to electronic standards for providing written authorization. A transformed result (such as a score for example, indicating a consumable grade such as "excellent") may be provided. In some embodiments, the information generated at block 285 may be provisioned to a location (for example, a secure server, an encrypted file mailbox, an access point, a message, or the like).

Finally, at block 290, the PATS system 100 may contact the requesting party 164, or the receiving party 184 to alert that they are authorized to access the generated information. In various embodiments, the system 100 may notify (for example, by encrypted email, or by short message service (SMS) message, or the like) the party that the information is available; require the party to acknowledge their obligations under law, if required, by affirming the singular purpose for the receipt of the information. The PATS system 100 may then allow the party to access the information at the provided location. In some embodiments, the access to the generated file (for example, the party's credit report) may be limited in time. The time limit may be 24 hours, or some other time limit that agreeably reduces the established and standard risk parameters.

Figure 3:
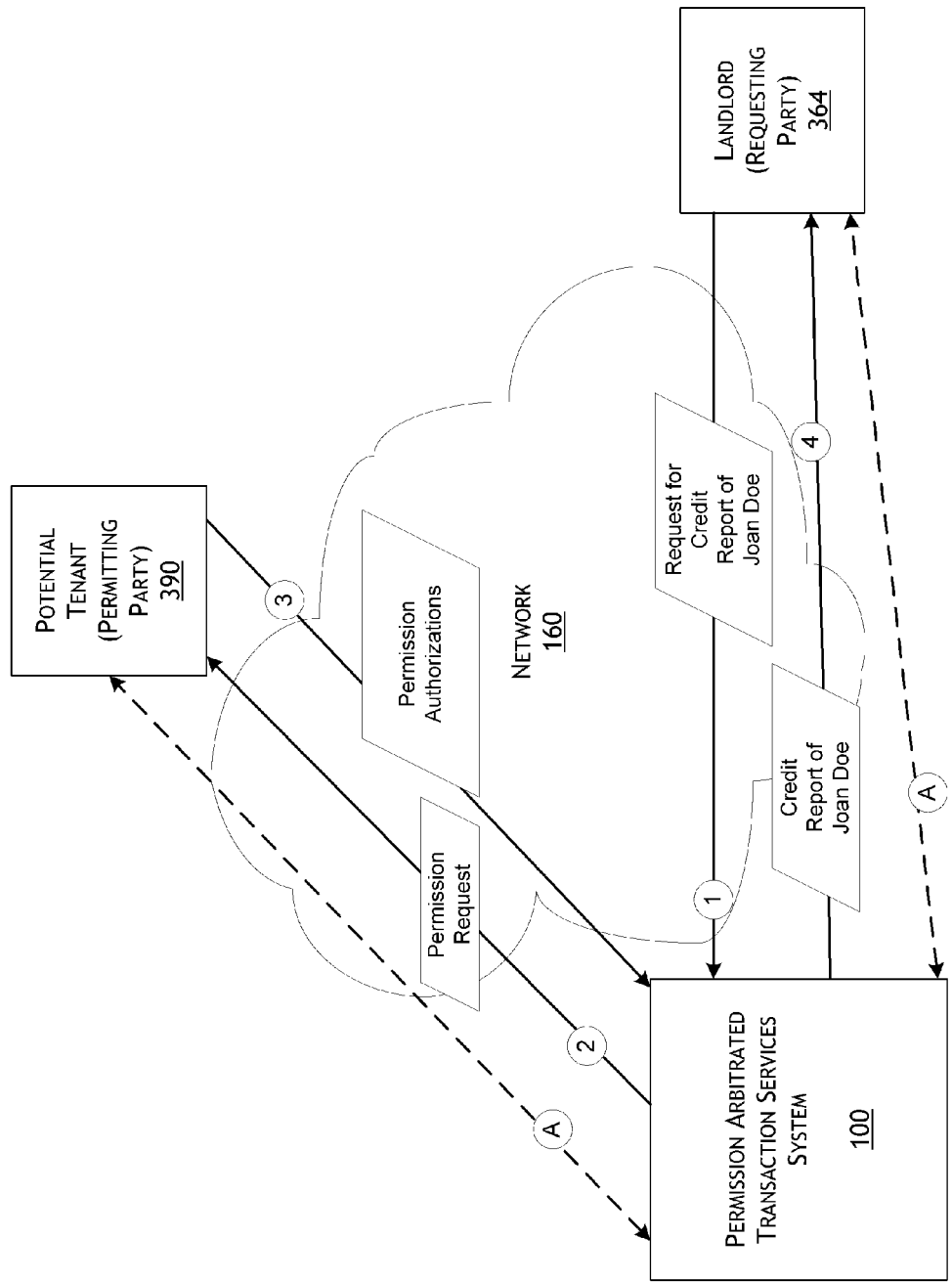
FIG. 3 illustrates one embodiment of the permission based transaction services system and the flow of data between the entities when a rental screening service is arbitrated.

The output provided by the PATS system 100 may depend on the type of service for which information is requested. FIG. 3 illustrates one embodiment of the permission based transaction services system and the flow of data between entities for tenant screening purposes. As seen in FIG. 3, for tenant screening services, (1) the landlord 364, as the requesting party, sends a request to the PATS system 100 via the network 160 for information regarding a potential tenant (e.g., a credit report of a potential tenant, Joan Doe). Then, (2) the PATS system 100 contacts, via the network 160, a potential tenant, as a permitting party 190, to receive permission to send information regarding the potential tenant 390 to the landlord 364. Then, (3) the potential tenant 390, via the network 160, provides permission to the PATS system 100 to send or otherwise provide access to the information to the landlord 364. The potential tenant 390 may decide to provide no or a limited amount of the requested information. For example, the potential tenant 390 may authorize the landlord 364 to access only a credit report including Personal Information, Profile Summary, Score Summary, Public records, or an extract of the credit report and score, and/or a decision. For example, the PATS system 100 may include, or may have access to logic provided by another entity, to analyze certain personal information of the potential tenant and provide an indicator of a recommended decision for the landlord 364, such as, for example, approve, refer, and/or decline based on the property manager's established parameters. Such decision logic may have various options for customization by the landlord 364, such as based on the landlords willingness to risk entering into an agreement with an unsuitable tenant. In one embodiment, the PATS system 100 may suppress certain personally identifiable information of the tenant 390 (either by default or by specific request by the potential tenant 390), such as social security number and detailed tradeline data from being returned in the output to the landlord 364. Based on the permissions authorized by the potential tenant, in step (4) the PATS system 100 returns to the landlord 364 only the information permitted by the potential tenant 390.

The example of FIG. 3 also illustrates authentication steps (labeled with "A") between the PATS system 100 and both of the potential tenant 390 and the landlord 364. As discussed above, some level of authentication of both the permitting party and the requesting party may be required. Various authentication techniques may be used, such as those illustrated and discussed with reference to FIG. 2. Authentication may occur prior to steps 1-4 discussed above and/or at other points between or during completion of the steps. For example, the landlord 364 may need to provide authentication information before providing the request for the credit report of Joan Doe, and may be required to again provide authentication information after permission has been granted by Joan Doe and prior to accesses the information.

In another embodiment, such as for example for hiring and employment services, the data output may include a credit report including Personal Information, Profile Summary, Score Summary, Public Records, or an extract of the credit report, and a credit score, and/or a decision (such as for example, hire, do not hire, based on the employer's established parameters). In some embodiments, the output may include only a credit score, or a transformation of a credit score into another abstraction.

Figure 4:
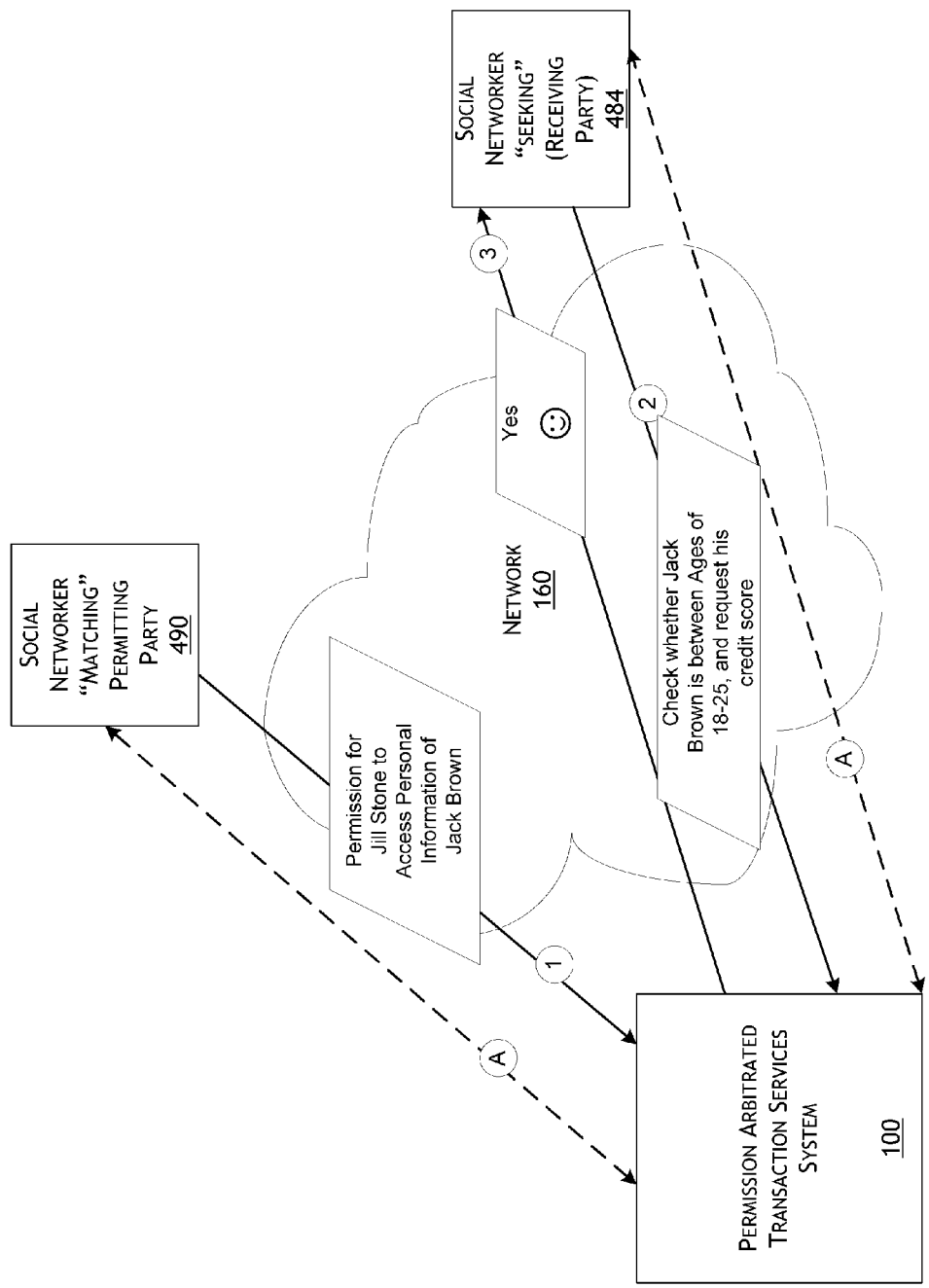
FIG. 4 illustrates another embodiment of the permission based transaction services system and the flow of data between the entities when a social networking service is arbitrated.

FIG. 4 illustrates another embodiment of the permission based transaction services system and the flow of data between the entities when a social networking service is arbitrated. As seen in FIG. 4, for social networking services, (1) a social networker, such as for example Jack Brown, as a permitting party 490, sends permission to the PATS system 100 via the network 160 to share information regarding his age, or other demographic information with other social networkers which may be seeking a social networker to match some criteria. The social networker 490 may decide to provide no or a limited amount of information. For example, the social networker 490 may authorize other seeking social networkers, as receiving parties 484, to only receive the information transformed from its original format, such as an indication of the other social networker's compatibility with Jack Brown. Then, (2) the PATS system 100, via the network 160, may receive from a social networking seeker 484, such as Jill Stone, some criteria of interested age or demographics of Jack Brown. For example, Jill may ask request an age check, and may submit a parameter such as "age between of 18-25" for Jack, also request to know Jack's credit score, and possibly an indication of compatibility with Jack. The PATS system 100 may then (3) send, via the network 160, information regarding the social networker 490, Jack Brown. In one embodiment, Personally Identifiable Information (including for example name, address, phone number, Social Security Number, and/or Driver's License Number), Score Summary, Profile Summary, or Detailed Tradeline data is not delivered to Jill. In some embodiments, the output may include a matching capability in which receiving parties receive a "yes/no" match to the parameters or criteria they enter. The response from the PATS system 100 at (3) may be "Yes" if Jack's profile includes Age of 18-25, "No" if not between 18-25, and "N/A" if unknown. Another example may include a request for compatibility (e.g., financial or social compatibility) where Jill submits a parameter of "excellent" credit to be matched, and the PATS system 100 returns a smiley face, wherein the smiley face is representative of Jack's credit score or possibly an indication of a match between Jacks personal information (e.g., Jack's credit score or some information derived from Jack's personal information, such as a financial stability indication) and criteria provided by Jill Stone.

The example of FIG. 4 also illustrates authentication steps (labeled with "A") between the PATS system 100 and both of the social networkers 490 and 484. As discussed above, some level of authentication of both the permitting party and the receiving party may be required. Various authentication techniques may be used, such as those illustrated and discussed with reference to FIG. 2. Authentication may occur prior to steps 1-3 discussed above and/or at other points between or during completion of the steps.

In another embodiment, for search of caregiver services, the data output may include a consumer report including Personal Information, Score Summary, and/or Public Records. The permission arbitrated transaction services system may suppress information such as the party's social security number and detailed Tradeline data from being returned in the output. In some embodiments, the output may include a transformation of a credit score into another abstraction (such as, for example a red, yellow or green symbol or icon), and/or a transformation of public records into another abstraction (such as for example, red, yellow or green symbol or icon).

In another embodiment, for electronic exchanges, the output may comprise authentication, credit and public record data that is returned in transformed format.

Figure 5:
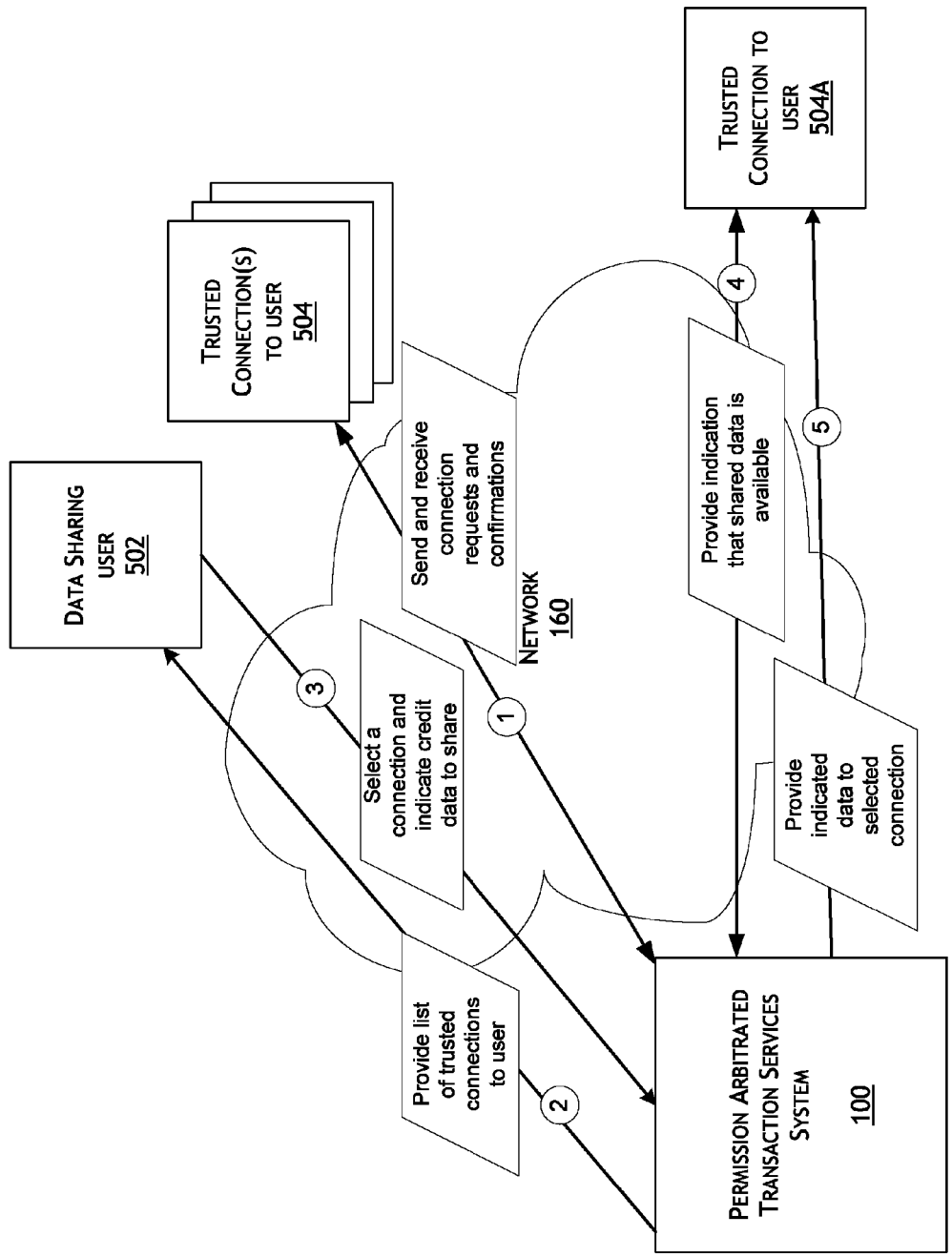
FIG. 5 illustrates the flow of data between one embodiment of the permission based transaction services system and computing devices operated by users that have established trusted connections with each other for sharing credit data and/or other data.

FIG. 5 illustrates the flow of data between one embodiment of the PATS system 100 and computing devices operated by users that have established trusted connections with each other for purposes of sharing credit data and/or other data. In the illustrated embodiment, the PATS system 100 may provide a data sharing user 502 with the ability to set up an account with the PATS system, identify other individuals or entities that maintain accounts with the PATS system in order to request that the PATS system create a connection between the users, and select one or more individuals or entities from among the user's connections in order to share selected data. Accordingly, the PATS system may enable the user to establish trusted connections with other individuals or entities, and select specific data associated with or about the given user to share with one or more of the user's trusted connections. The data sharing user may access the user's own financial data and other information that the user may need for important lending, purchasing, social and/or educational activities, and may select which of this data to share directly with a connection. The selected data of the user to share with one or more trusted connections may include consumer information available to a credit bureau such as credit profile data, demographic data, marketing data, credit scores, marketing scores, behavioral scores, inferred data, identity information, personal information, employment data, public data, automotive data, and the like.

As illustrated in FIG. 5, (1) the PATS system 100 establishes connections between the data sharing user 502 and trusted connections 504, such as by sending connection requests and receiving acceptances or confirmations of the requests. These trusted connections to the user may be individuals or entities with which the data sharing user 502 would like to add to a network of the user for purposes of trusted data sharing. For example, the trusted connections 504 may include friends, family, account providers, business associates, potential customers, employers, potential employers, landlords, vendors, and/or other individuals or entities with whom the user may have interest in sharing credit data or personal information. In some embodiments, establishing the connection information may include the data sharing user 502 indicating one or more users with whom he would like to establish a connection. In response, the PATS system may send a connection request via the network 160 to each of the indicated users (illustrated as trusted connections 504). The trusted connections may receive the connection requests, for example, via SMS message, email and/or a user interface generated by the PATS system upon the user accessing an online portal for an account established with the PATS system. If the receiving user recognizes the data sharing user 502 and chooses to accept the connection request, the PATS system may store connection information in one or more data stores (such as mass storage device 120) indicating a connection between data sharing user 502 and the other user (such as one of trusted connections 504).

Once the data sharing user 502 has established trusted connections with one or more other users 504, the PATS system 100 may (2) provide the user with a list of the user's connections, such as via a user interface including elements similar to those discussed below with reference to FIGS. 6 and 7. The list may be provided, for example, as part of a user interface that enables the data sharing user to select one or more of these pre-established connections with which to share credit data and/or other personal information in a secure, trusted manner. From the user interface generated by the PATS system, the data sharing user 502 may (3) select one or more of the connections and indicate data associated with the user that the user would like to share with the indicated connection. For example, the user may indicate that the PATS system should allow a specific friend, illustrated as trusted connection 504A, to access the user's credit score and home address. The user may, in some embodiments, indicate a "category" of the trusted connection 504A. For example, the user may indicate that more information should be shared with a family member than with a vendor. In some embodiments, the PATS system may enable the user to place certain limits on the access to the shared data granted to trusted connection 504A, such as options for the user to indicate that the connection can only access the data once, may only access the data for a certain amount of time (such as only during the next day, week, or up until a set time), or some other limitation.

As illustrated in FIG. 5, the PATS system may (4) provide an indication to the indicated connection 504A that shared data is available for viewing. In some embodiments, the indication may be provided to the trusted connection 504A via SMS message, a phone call and/or email. In other embodiments, the trusted connection 504A may simply be notified that data is available for viewing the next time that the trusted connection accesses an account established or associated with the PATS system, such as by entering a username, password and/or providing other authentication credentials. In some embodiments, regardless of the type of notification provided to the trusted connection, the PATS system may request authentication information (such as a username, password, answers to security questions, verification of personal information, a trusted identifier, or the like) prior to providing the trusted connection with the data that the data sharing user 502 selected to share. Once the trusted connection 504A has successfully accessed the PATS system and provided any requested identity authentication information, the PATS system may (5) provide to the trusted connection 504A the data that the data sharing user 502 selected to share (in this example, the data sharing user's credit score and home address). As will be appreciated, embodiments similar to that illustrated in FIG. 5 may include many of the above features previously discussed with respect to other embodiments, such as receiving and storing electronic signatures and/or other permission data given by the data sharing user and/or trusted connections in order to comply with legal requirements for sharing credit data in the appropriate jurisdiction.

Figure 6:
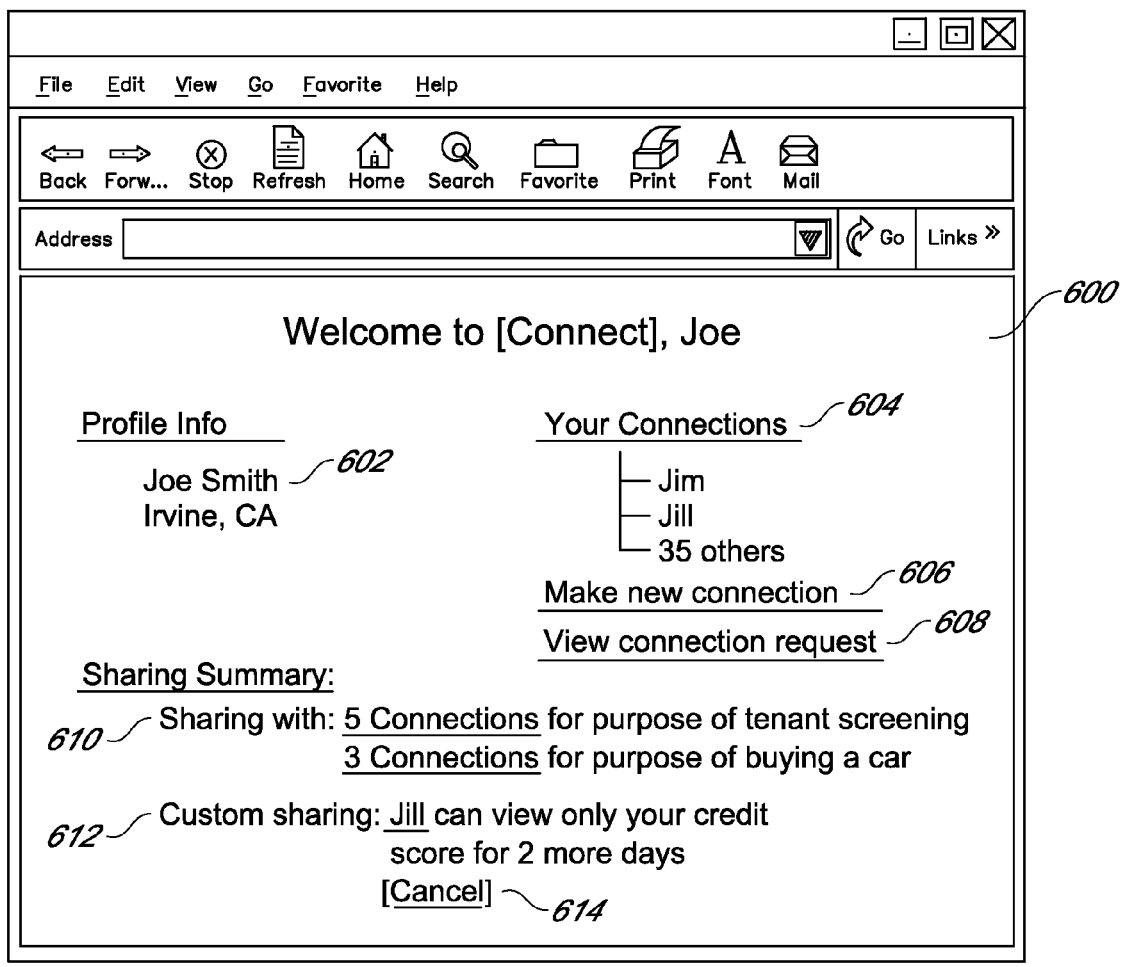
FIG. 6 is an illustrative embodiment of a user interface that may be generated by one or more modules of a permission based transaction services system that enables a user to set up and review data sharing with connected users.

FIG. 6 is an illustrative embodiment of a user interface 600 that may be generated by the PATS system 100 that enables a user to set up and review data sharing with connected users. As illustrated, the user interface 600 may be shown to a user, Joe Smith, after the user has logged in to the user's account maintained by the PATS system. The user interface includes a partial display of profile information 602, which includes the user's name and address. As will be appreciated, profile information may further include, in some embodiments, personal information such as date of birth, employment information, and/or information that may be stored by a social networking service and/or verified by a credit bureau. The user interface 600 also includes a list of the user's previously established connections 604. The user can select a name from the connection list 604, for example, in order to view additional information about the selected connection. If the user would like to establish a new connection with another user, the user may select option 606. In some embodiments, selection of option 606 may cause the PATS system 100 to generate a user interface from which the user can search for an individual or business entity with which the user would like to establish a new connection, such as by entering a name, address, email address, company name, or other information of the desired connection. Illustrative user interface 600 further includes option 608, which the user may select in order to view any pending connection requests received from other users, which the user may decide whether to accept or decline.

User interface 600 includes a sharing summary section, which indicates a purpose-based sharing summary 610 and a custom sharing summary 612. As indicated by purpose-based sharing summary 610, the user has currently selected to share data with five connections for the purpose of tenant screening. These connections may be, for example, potential landlords of properties that the user is interested in renting. The data shared with these landlord connections may be, for example, a preset selection of credit data for the purpose of tenant assessment that includes Personal Information, Profile Summary, Score Summary, Public Records, and/or an extract of the user's credit report and score. The purpose-based sharing summary 610 also indicates that the user is sharing data with three connections for purposes of buying a car, which may include sharing a different set of data than that which is shared for purposes of tenant screening. Custom sharing summary 612 indicates that the user is sharing his credit score with a single connection, Jill, for two days. The sharing with Jill may have been set up by the user using a user interface generated by the PATS system 100, such as a user interface similar to that discussed below with reference to FIG. 7. The user may select cancel option 614 in order to cancel any of the current data sharing approvals identified in sharing summaries 610 and 612.

Figure 7:
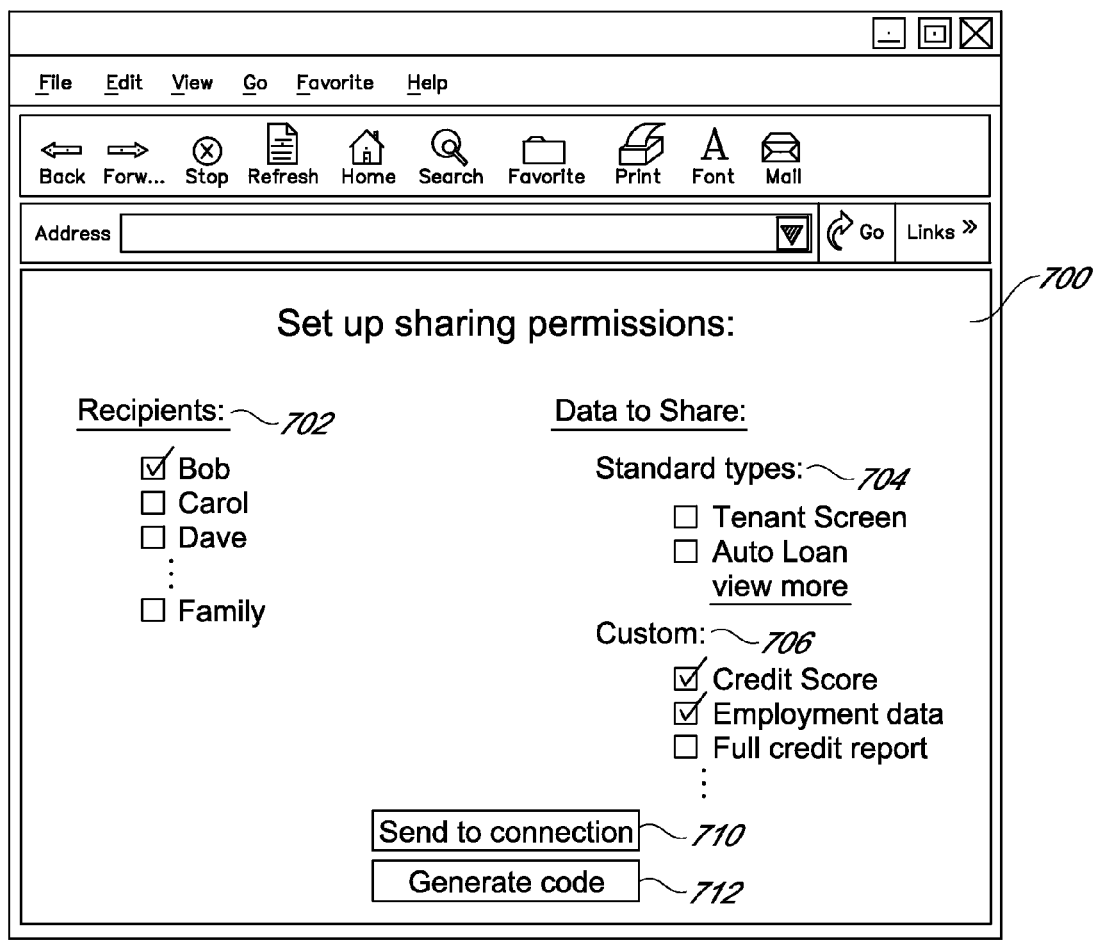
FIG. 7 is an illustrative embodiment of a user interface that may be generated by one or more modules of a permission based transaction services system that provides options for permitting data sharing with one or more individuals.

FIG. 7 is an illustrative embodiment of a user interface 700 that may be generated by the PATS system 100 that provides options for a user to permit data sharing with one or more individuals or entities with which the user has established a connection. The user may select one or more desired recipients of the user's credit data from the connections list 702, which may list individuals with which the user has previously established trusted connections for purposes of data sharing. As illustrated, the potential recipients list includes "family," which may be a group designation associated with a number of individuals that the given user has indicated are family members of the user. In addition to selecting which individual(s) the user would like to share data with, the illustrative user interface 700 includes selectable options 704 and 706 that enable the user to indicate the types of data to be shared with the selected individual(s). Options 704 include "tenant screen" and "auto loan," for example, which may be credit sharing situations or purposes which are already predetermined to include certain credit report information tailored to the given purpose. Alternatively, the user may select from options 706 in order to custom select one or more data fields or data types to create a custom report or collection of credit data and/or other data to share. For example, options 706, as illustrated, include an indication that the user has selected to share the user's credit score and employment data with one connection, Bob. The user may select option 710 in order to instruct the PATS system 100 to notify the selected recipient (s) that the user has selected to share data with the given recipient. Alternatively, the user may select option 712 in order to request that the PATS system generate a code or identifier representing the selected data sharing, as discussed further below. In other embodiments, the user may select to initiate the sharing of the selected data by physically touching or "bumping" a phone (or other computing device) of the user with a phone (or other computing device) of the recipient (not illustrated).

Figure 8:
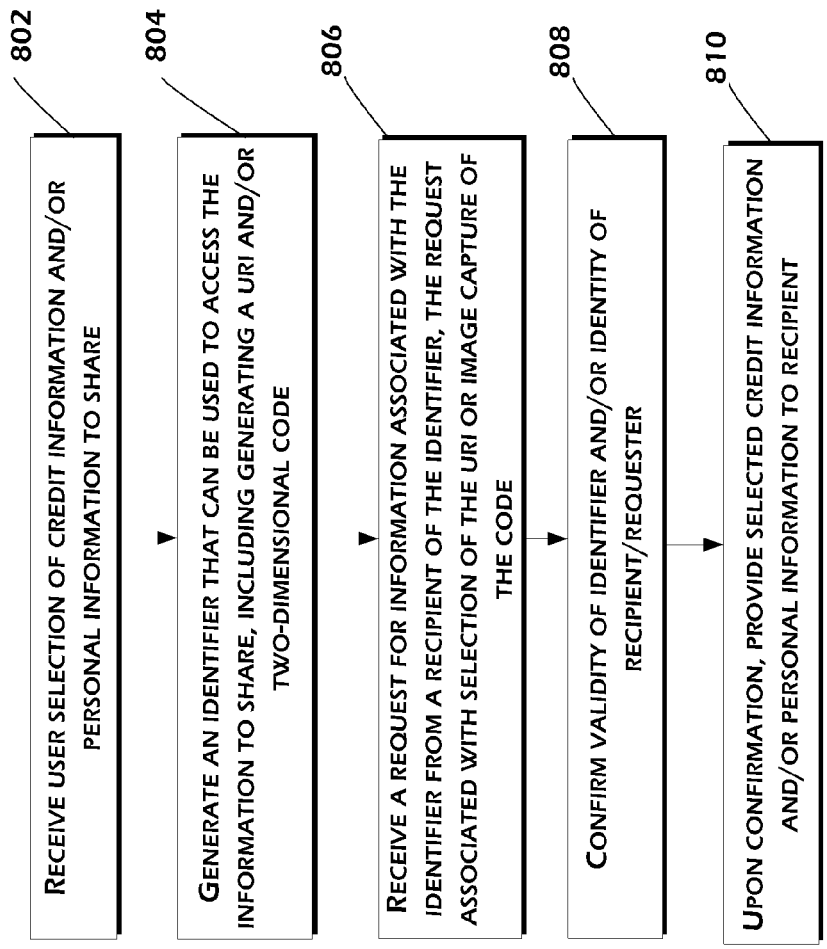
FIG. 8 is a flow chart illustrating one embodiment of a method for generating an identifier that enables a recipient to access selected credit data and/or other data.

FIG. 8 is a flow chart illustrating one embodiment of a method for generating an identifier that enables a recipient of the identifier to access selected credit data and/or other data. FIG. 8 may be generated, in one example, in response to a user selecting the "generate code" option 712 discussed above with reference to user interface 700. Depending on the embodiment, the method of FIG. 8 may include fewer or additional blocks and/or the blocks may be performed in a different order than is illustrated. Software code configured for execution on a computing device in order to perform the method of FIG. 8 may be provided on a computer readable medium, such as a compact disc, digital video disc, flash drive, or any other tangible medium. Such software code may be stored, partially or fully, on a memory device of the computer, such as the memory 130 (FIG. 1), in order to perform the method outlined in FIG. 8. For ease of explanation, the method will be described herein as performed by a PATS system 100, such as by the PATS module 150; however, the method may be performed by any other suitable computing device. In one embodiment, the illustrative method and/or other aspects of the present disclosure may be implemented in a cloud computing environment.

The illustrative method begins at block 802, where the PATS system 100 receives a user selection of credit information and/or other information regarding the user that the user would like to share with one or more individuals or entities via a generated identifier. In some embodiments, the selection may indicate types of data (for example a credit score, employment data, address information, and/or any of the other types of data previously discussed above). Alternatively or additionally, the user selection may indicate a type of report to share. The selection may indicate one or more individuals that will be given access to the selected data, such that no individual other than those indicated will be able to access the selected data associated with the identifier. The indicated individuals, in some embodiments, may include specific users (or groups of users) of the PATS system 100 with whom the given user is connected, specific users (or groups of users) of the PATS system with whom the given user is not connected, and/or individuals that do not have an account with the PATS system. In other embodiments, the user selection might not include information identifying a specific user, but may instead be associated with the user's request to generate an identifier or code that will enable any recipient of the identifier to access the selected data. Such a code may include other security mechanisms, such as being encrypted, having an expiration period, being a one-time use code that only allows the first requestor of the data associated with the code to access the data, and/or other mechanisms for securing access to data via a network.

At block 804, the PATS system 100 generates an identifier that can be used to access the data that the user selected to share (received at block 802). In some embodiments, the generated identifier may be a uniform resource identifier ("URI"). For example, selection of the generated URI by a recipient may cause a browser or other application executed by a computing device of the recipient to request data associated with the URI from the PATS system 100. In some embodiments, the generated identifier may be a graphical code, such as a Quick Response Code ("QR code"), or any other one-dimensional barcode, two-dimensional code or other graphical representation capable of conveying data. In some embodiments in which a graphical code is generated, the PATS system may first generate a URI or other textual descriptor representing the shared data or referencing a location from which the shared data may be accessed, and may then generate a graphical code (such as a QR code) that represents the generated URI. For example, the graphical code may be generated according to known methods that accept text information (which may include the generated URI, in the given example) as input, and which output a graphical code that may be decoded by an appropriate decoding module executed by a recipient computing device that captures an image of the generated graphical code.

Upon generating the identifier, the PATS system 100 may store information associated with the identifier, identifying the indicated data to share, and/or identifying the permitted users in one or more data stores, such as mass storage device 120. The stored data may be retrieved and used by the PATS system 100 to determine the permissions and appropriate data to share when a recipient of the identifier later requests the shared data.

In some embodiments, a URI, graphical code and/or other identifier generated by the PATS system 100 at block 804 may be encrypted. The generated identifier may, in some embodiments, be associated with an expiration time. For example, based on a sharing time period selected by the user and/or based on default time periods for one or more types of sharing stored in the mass storage device 120 or other data store, expiration time and date information may be stored by the PATS system 100 in association with the identifier. Stored expiration information may later be retrieved by the PATS system 100 when a recipient requests the shared data associated with the identifier in order to determine whether the expiration time has passed. In other embodiments, the expiration information may be encrypted and embedded in the identifier itself. In some embodiments, the generated identifier may be a one-time use identifier. For example, in one embodiment, a user may request a new identifier each time that the user wants to share data with any other individual, and the PATS system may only provide the shared data to the first requester (such as the first recipient of a generated URI that requests the data associated with the URI from the PATS system).

Once the PATS system 100 has generated the identifier, the illustrative method proceeds to block 806, where the PATS system receives a request for information associated with the identifier from a recipient of the identifier. The request may be received, for example, from the computing device of a user who selected the identifier from an email or other message sent by the sharing user, or from a user interface generated by the PATS system indicating that shared data was available to view. In embodiments in which the generated identifier includes a graphical code, the request for information associated with the identifier may be received by the PATS system as a result of a computing device of the requesting user capturing a digital image of the graphical code (such as using a camera of a mobile computing device, such as a phone or tablet). The graphical code may have been captured, for example, from a display screen of the sharing user, which may occur when the sharing user is in physical proximity to the recipient and allows the recipient to capture the displayed graphical code from a display of a mobile device or other computing device of the sharing user. In other embodiments, the graphical code may be captured from a printed page provided to the recipient by the sharing user, or from some other digital display or printed source.

In response to receiving the request for information associated with the identifier from the recipient, the PATS system may confirm validity of the identifier and/or the identity of the recipient of the code (the requester of the data associated with the code), at block 808. The validity confirmation may include, for example, decrypting information in the identifier to determine any expiration information and/or information identifying authorized recipients. Alternatively or additionally, the validity confirmation may include the PATS system retrieving additional information regarding the identifier from the mass storage device 120 or other data store in order to determine what security mechanisms, authorized recipient identification information and/or expiration periods have been associated with the identifier. The PATS system 100 may additionally confirm that the data sharing associated with the identifier has not been canceled or altered by the sharing user since the identifier was generated. Confirming the identity of the recipient may include requiring login credentials for the recipient's account with the PATS system and/or requiring the recipient to answer identity authorization questions. Confirming the identity of the recipient is discussed further below with reference to FIG. 10. If the identifier is determined to be invalid or the recipient is determined to not be authorized to access the shared data, the PATS system 100 may prevent the recipient from accessing any data associated with the identifier.

If the PATS system determines that the identifier is valid and the recipient is authorized to access the shared data, the illustrative method proceeds to block 810, where the PATS system 100 provides the recipient with the credit data and/or other information that the sharing user selected to share in association with the generated identifier. The shared data may be provided, for example, via a user interface generated by the PATS system. As discussed above, in some embodiments, the shared data may include credit data, such as a full or partial credit report and/or a credit score of the sharing user. In some embodiments, the PATS system 100 may provide the most recent relevant credit data pulled or retrieved in response to a previous credit information request by the sharing user or an authorized third party. In other embodiments, the PATS system may retrieve new credit data from a credit bureau (or from a data store and/or module local or remote to the PATS system 100, such as in embodiments in which the PATS system is operated by a credit bureau). Accordingly, the recipient may be provided with up-to-date credit data each time that the data associated with the identifier is requested. In some embodiments, the credit data may be provided in a secure environment with an indication that the data has been validated or confirmed accurate by a credit bureau. For example, the shared data may be provided via a program application distributed by a credit bureau or partner of a credit bureau and executed by a computing device of the recipient.

Figure 9:
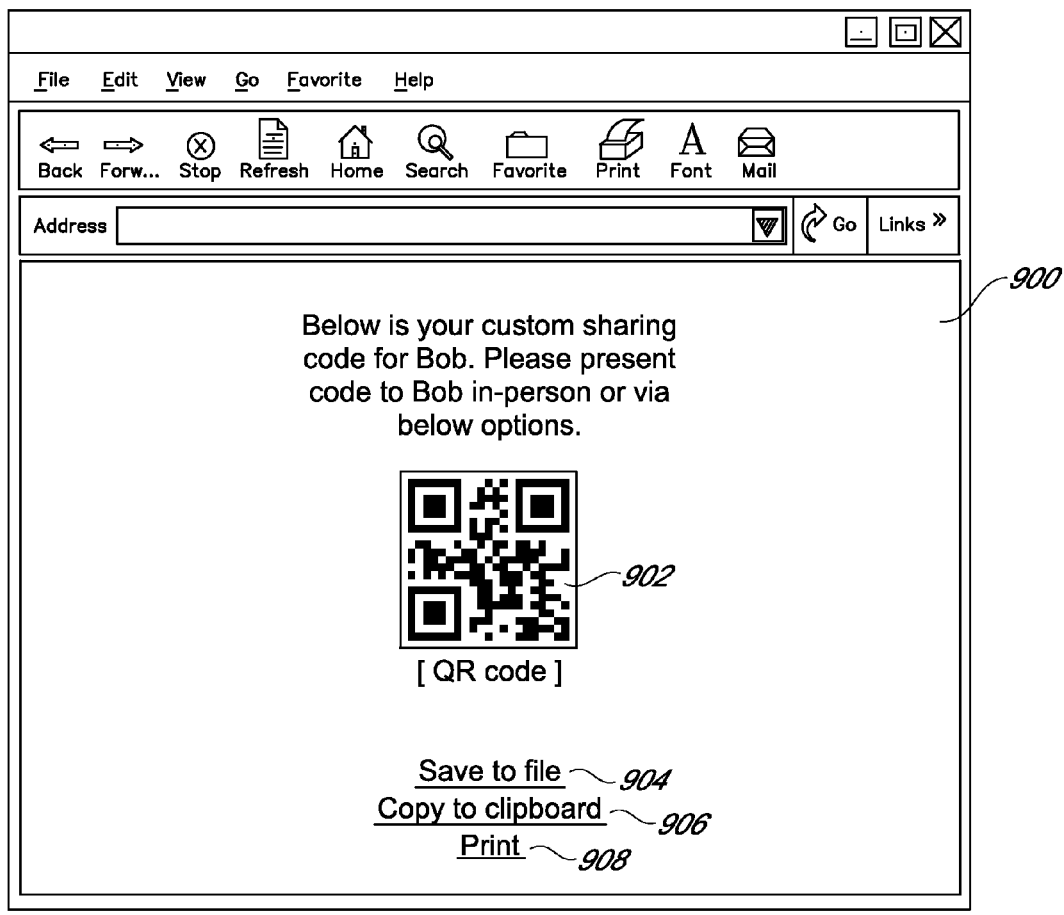
FIG. 9 is an illustrative embodiment of a user interface that may be generated by one or more modules of a permission based transaction services system that includes a generated two-dimensional code that may be used to access selected credit data and/or personal data.

FIG. 9 is an illustrative embodiment of a user interface 900 that may be generated by one or more modules of the PATS system 100 that includes a generated two-dimensional code 902 that may be used by an authorized recipient to access selected credit data and/or personal data of a sharing user. While user interface 900 is illustrated as displayed by a browser, a similar user interface may, in some embodiments, be presented by an application program provided by the operator of the PATS system for installation on a computing device of the sharing user. As illustrated, user interface 900 may be presented to a sharing user, such as data sharing user 502, in response to the user's selection of "generate code" option 712, discussed above with reference to illustrative user interface 700. In the illustrated embodiment, the displayed identifier 902 is a QR Code generated by the PATS system 100, such as by the method discussed above with reference to FIG. 8. As discussed above, in other embodiments, a generated identifier may be presented in a form other than a QR Code or other graphical representation, such as by displaying a URI.

In order to share the data with the intended recipient, the sharing user may allow the intended recipient to capture a digital image of code 902 (as the user interface 900 is displayed on a screen or other display of the user's computing device) using a digital camera, such as a camera of a phone or other computing device operated by the recipient. Alternatively, the sharing user may select option 904 to save the identifier 902 to a file, which may be selected if the user would like to retrieve the identifier 902 for display or printing at a later time. The user may select option 906 in order to copy the identifier to an electronic clipboard of the user's computing device, from which the user may electronically paste the identifier in an email, an SMS message, a document, or any other location. If the user instead wishes to print the identifier 902, the user may select option 908.

Figure 10:
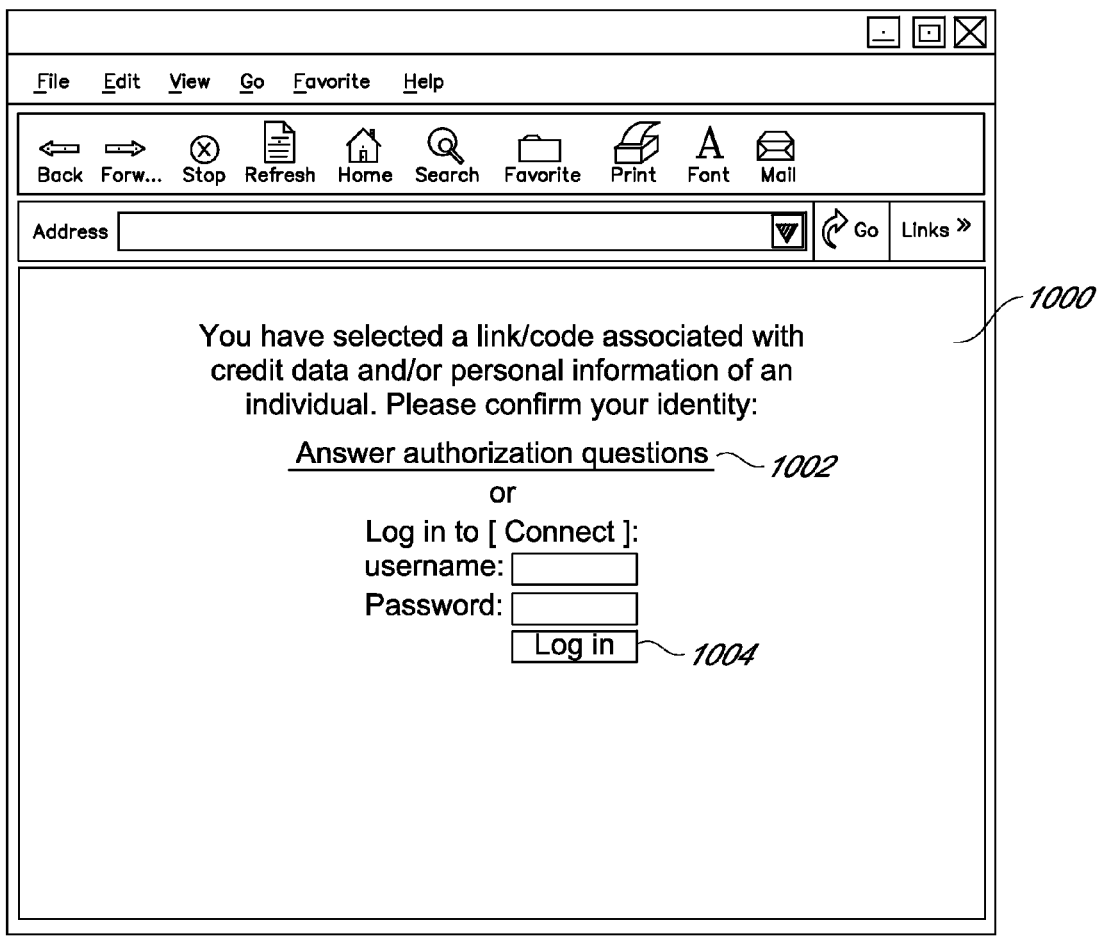
FIG. 10 is an illustrative embodiment of a user interface that may be generated by one or more modules of a permission based transaction services system in response to a user request for data associated with a previously generated identifier.

FIG. 10 is an illustrative embodiment of a user interface 1000 that may be generated by one or more modules of the PATS system 100 in response to a user request for data associated with an identifier previously generated by the PATS system. For example, user interface 1000 may be presented to a recipient upon the recipient selecting a URI generated by the PATS system 100 (or entering the URI into a browser), and/or capturing an image of a graphical code generated by the PATS system. In the illustrated embodiment, the recipient is required to confirm his or her identity prior to receiving or accessing any of the data sharing user's information. The recipient may select option 1002 in order to answer authorization questions, which may include questions to authenticate the identity of the recipient. Various types of questions and other methods that are known in the art of identity authentication may be employed, in some embodiments. If the recipient has an account with the PATS system 100, the recipient may instead select to enter his or her login credentials, illustrated as a username and password, and then select the "log in" option 1004 in order to view the shared data associated with the identifier previously selected by the recipient. In other embodiments, the recipient may provide the PATS system with a trusted identifier that identifies the recipient.

Figure 11:
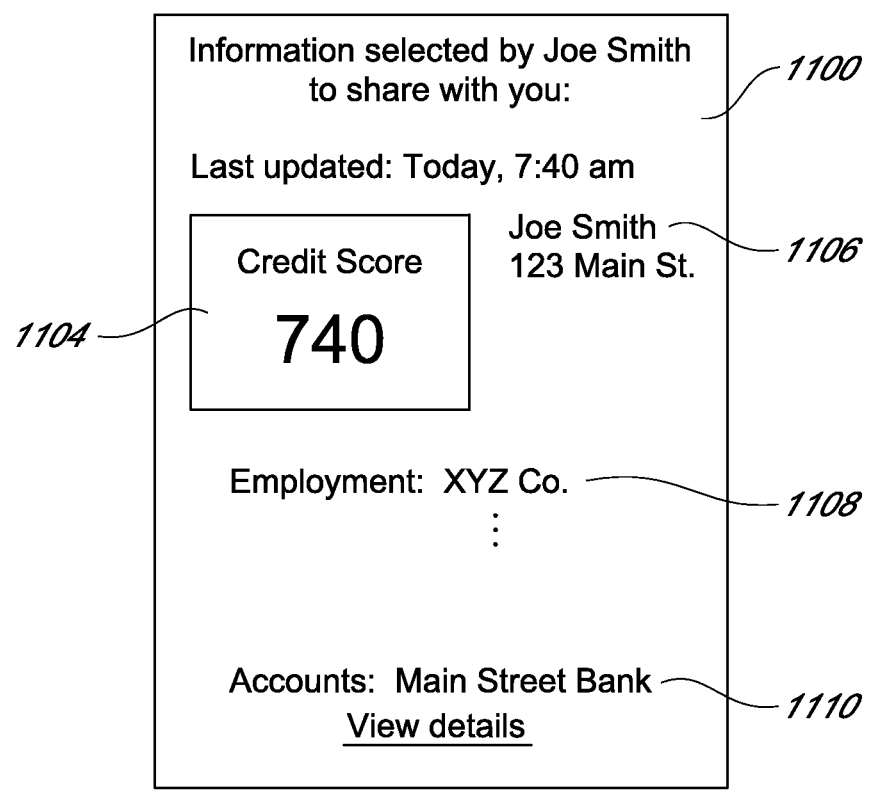
FIG. 11 an illustrative embodiment of a user interface that may be generated by one or more modules of a permission based transaction services system that provides a recipient with credit data associated with a previously generated identifier.

FIG. 11 an illustrative embodiment of a user interface 1100 that may be generated by the PATS system 100 (or in part by a partner system, such as a credit bureau, in some embodiments) that provides a recipient with credit data associated with a previously generated identifier. The illustrative user interface 1100 may be presented, for example, after a recipient has selected to view the data associated with a generated identifier, and the PATS system has confirmed the validity of the identifier and the identity of the recipient as an authorized recipient of the shared data. Illustrative user interface 1100 presents credit data and other information associated with an individual, Joe Smith (who may be, for example, data sharing user 502), which may be provided by a credit bureau and/or one or more other data sources, such as by being retrieved from mass storage device 120. The user interface 1100 includes a credit score 1104, address and name 1106, employment data 1108, and financial account information 1110. The types of data displayed may be types specifically selected by the data sharing user, or may be associated with a predetermined report type (such as a basic credit report). As will be appreciated, a user interface 110 or similar report may include, in various embodiments, data of various types. As discussed above, other types of data may include, but are not limited to, demographic data, marketing data, marketing scores, behavioral scores, inferred data, identity information, personal information, public data, automotive data, and the like.

Embodiments of the permission arbitrated transaction services systems and methods disclosed herein may also provide a framework in which commercial parties such as developers, application engineers, and the like, build independent applications and services leveraging the PATS system 100 data, and the commercial parties may deliver those applications and services to their customers.

Embodiments of the permission arbitrated transaction services systems and methods disclosed herein may comprise a component based framework developed to meet the needs and opportunities of a multitude of international markets, localized for regulatory rules. For example, the framework may be developed for the United States market in compliance with the Fair Credit Reporting Act (FRCA). The framework may also be developed for the United Kingdom, for example, in compliance with the Data Protection Act (DPA).

The permission arbitrated transaction services systems and methods disclosed herein may support credit bureau businesses and websites, personal connection websites (such as Facebook, MySpace, and the like), matchmaking sites (such as eHarmony®, Match.com®, and the like), employment-relates sites (such as LinkedIn®, ZoomInfo, and the like), people search sites (such as RapLeaf, Pipl, and the like), communications services (such as Skype™, and the like), mobile telephony platforms, tenant screening companies, credit reporting companies, and/or other businesses to enable two or more people or entities to exchange personal information in an arbitrated, secure manner, quickly, easily and safely.

The systems and methods disclosed herein may also support doctors, lawyers, small retailers, and other parties wishing to initiate permissible purpose requests for credit or other related variables for purposes of making business decisions.

Some of the contemplated benefits of some embodiments of permission arbitrated transaction services systems and methods include the ability to provide end users with assessment of their connections before getting too involved with them in a fast, inexpensive and reliable manner; the ability to provide delivery channel partners with a complementary value add service to their constituents as well as an additional source of revenue; the ability to provide credit bureaus with scaled enablement for distribution of credit data, collection of proof of life data on consumers, additional revenue sources, leveraging of other business assets.

SUMMARY

All of the processes described above may be embodied in, and fully automated via, software code modules executed by one or more general purpose computers. The code module may be stored in any type of tangible computer-readable medium or other computer storage device. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices. Some or all of the methods may alternatively be embodied in specialized computer hardware. As will be apparent, the features, and attributes of the specific embodiments disclosed above may be combined in different ways to form additional embodiments, all of which are fall within the scope of the present disclosure. Although this disclosure has been described in terms of certain preferred embodiments and applications, other embodiments and applications that are apparent to those of ordinary skill in the art, including embodiments which do not provide all of the features and advantages set forth herein, are also within the scope of this disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system for electronically sharing credit data, the system comprising:
   a user data store configured to store information associated with a plurality of users, the information including connection information that indicates a connection established between a first user and each of two or more of the plurality of users;
   a credit data store configured to store credit data associated with each of a plurality of individuals, wherein the plurality of individuals includes the plurality of users;
   a computing system comprising one or more computing devices, said computing system configured to electronically communicate with the user data store and the credit data store, the computing system programmed via executable instructions to at least:
   generate a user interface for display, the user interface comprising information identifying at least a subset of the plurality of users for which a connection has been previously established with the first user based at least in part on the information stored in the user data store, the user interface further comprising an element configured to enable the first user to select at least one of the users of the subset in order to request sharing of credit data with the selected user;
   receive a credit data sharing request associated with a selection by the first user of at least one of the users for which a connection has been established with the first user, wherein the credit data sharing request includes information identifying the selected at least one user and information identifying credit data of the first user to be shared with the selected at least one user;

provide an electronic notification to the selected at least one user indicating that credit data has been selected to be shared with the at least one user;

receive a request from the at least one user to review the credit data that has been selected to be shared with the at least one user; and in response to the request:
retrieve, from the credit data store, the credit data of the first user to be shared with the selected at least one user; and
electronically provide the retrieved credit data of the first user to the at least one user.

2. The system of claim 1, wherein the credit data sharing request includes an indication of a purpose for sharing data.

3. The system of claim 2, wherein the purpose includes at least one of tenant screening or a loan application.

4. The system of claim 1, wherein the computing system is further configured to, prior to electronically providing the retrieved credit data of the first user to the at least one user, determine whether a time limit associated with the credit data sharing request has expired.

5. A computer-implemented method for electronically sharing credit data, the computer-implemented method comprising:

as implemented by one or more computing devices configured with specific executable instructions:
presenting generating a user interface for display to a first user, the user interface comprising information identifying at least a subset of a plurality of users for which a connection has been previously established with the first user, the user interface further comprising an element configured to enable the first user to select at least one of the users of the subset in order to request sharing of credit data with the selected user;
receiving, from a computing device, a credit data sharing request associated with a selection by the first user of at least one of the users for which a connection has been established with the first user, wherein the credit data sharing request includes information identifying the selected at least one user and information identifying credit data of the first user to be shared with the selected at least one user;
providing an electronic notification to the selected at least one user indicating that credit data has been selected to be shared with the at least one user;
receiving a request from the at least one user to review the credit data that has been selected to be shared with the at least one user; and
in response to the request:
retrieving credit data of the first user to be shared with the selected at least one user; and
providing a report of the retrieved credit data of the first user to the at least one user.

6. The computer-implemented method of claim 5, further comprising, prior to generating the user interface, establishing the connection between the first user and the selected at least one user, wherein establishing the connection comprises:
receiving a connection request from the first user, the connection request including information identifying the at least one user;
electronically sending a connection invitation to the at least one user; and
receiving an acceptance of the connection from the at least one user.

7. The computer-implemented method of claim 5, wherein the report includes a credit score.

8. The computer-implemented method of claim 5, wherein providing the report comprises generating an abstraction of the retrieved credit data.

9. The computer-implemented method of claim 8, wherein the abstraction comprises an icon that ranges from a smile to a frown.

10. The computer-implemented method of claim 5, wherein providing the report of the retrieved credit data comprises providing an indication of whether the first user would be a suitable tenant or an indication of whether the first user would be romantically compatible with the at least one user.

11. A system, comprising:
a server system that provides functionality for users to register with a service, and to establish connections with other users of the service;
a computer data repository maintained by the server system, the computer data repository configured to store information associated with a plurality of users, the information including connection information that indicates trusted relationships established between a first user and each of two or more of the plurality of users, wherein the computer data repository further stores credit data associated with each of a plurality of users of the service; and
an application program executed by the server system, the application program configured to:
cause the server system to use the connection information to enable the first user to select at least one user with which a connection has been established with the first user in order to request sharing of selected credit data with the selected at least one user;
provide an electronic notification to the selected at least one user indicating that credit data has been selected to be shared with the at least one user;
receive a request from the at least one user to review the credit data that has been selected to be shared with the at least one user; and
electronically provide credit data of the first user to the at least one user based at least in part on the received request.

12. The system of claim 11, wherein the computer data repository further stores credit data associated with each of a plurality of users of the service.

13. The system of claim 11, wherein electronically providing the credit data includes generating a credit report of the first user for electronic delivery to the at least one user.

14. The system of claim 11, wherein the application program is further configured to:
receive a second request from the at least one user to review the credit data that has been selected to be shared with the at least one user; and
electronically provide updated credit data of the first user to the at least one user based at least in part on the received second request.

15. The system of claim 11, wherein the application program is further configured to verify an identity of the at least one user prior to electronically providing the credit data of the first user to the at least one user.

16. The system of claim 15, wherein verifying the identity of the at least one user comprises requiring the at least one user to provide login information associated with an account of the user maintained by the server system.

17. Non-transitory computer storage that stores executable instructions that direct a computing system to perform a process that comprises:
generating a user interface for display to a first user, the user interface comprising information identifying at least a subset of a plurality of users for which a connection has been previously established with the first user, the user interface further comprising an element configured to enable the first user to select at least one of the users of the subset in order to request sharing of credit data with the selected user;

receiving a credit data sharing request associated with a selection by the first user of at least one of the users for which a connection has been established with the first user, wherein the credit data sharing request includes information identifying the selected at least one user and information identifying credit data of the first user to be shared with the selected at least one user;

providing an electronic notification to the selected at least one user indicating that credit data has been selected to be shared with the at least one user;

receiving a request from the at least one user to review the credit data that has been selected to be shared with the at least one user; and in response to the request:
- retrieving credit data of the first user to be shared with the selected at least one user; and
- providing the retrieved credit data of the first user to the at least one user.

18. The non-transitory computer storage of claim 17, wherein the retrieved credit data is provided to the first user with an indication that the provided credit data has been verified by a credit bureau.

* * * * *